US009436830B2

United States Patent
Pomerantz et al.

(10) Patent No.: US 9,436,830 B2
(45) Date of Patent: *Sep. 6, 2016

(54) SECURING ACCESS OF REMOVABLE MEDIA DEVICES

(71) Applicant: SANDISK TECHNOLOGIES INC., Plano, TX (US)

(72) Inventors: Itzhak Pomerantz, Kfar Saba (IL); Rahav Yairi, Oranit (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/973,502

(22) Filed: Aug. 22, 2013

(65) Prior Publication Data

US 2014/0109240 A1    Apr. 17, 2014

Related U.S. Application Data

(63) Continuation-in-part of application No. 13/654,302, filed on Oct. 17, 2012.

(51) Int. Cl.
| | | |
|---|---|---|
| G06F 21/00 | (2013.01) | |
| G06F 21/60 | (2013.01) | |
| G06F 21/85 | (2013.01) | |
| G06F 21/56 | (2013.01) | |

(52) U.S. Cl.
CPC .............. *G06F 21/60* (2013.01); *G06F 21/85* (2013.01); *G06F 21/56* (2013.01)

(58) Field of Classification Search
CPC ......... G06F 21/60; G06F 21/85; G06F 21/56
USPC ................................................. 726/1, 16, 27
See application file for complete search history.

(56) References Cited

U.S. PATENT DOCUMENTS

| | | | | |
|---|---|---|---|---|
| 5,695,365 | A | | 12/1997 | Kennedy et al. |
| 5,818,691 | A | * | 10/1998 | McMahan .............. E05C 19/022 361/679.43 |
| 6,145,029 | A | * | 11/2000 | Deschepper ........ G06F 13/4027 710/303 |
| 6,208,509 | B1 | * | 3/2001 | Cha ........................ G06F 1/1616 312/332.1 |
| 6,239,969 | B1 | * | 5/2001 | Howell .................. G06F 1/1632 361/679.41 |
| 6,282,594 | B1 | * | 8/2001 | McTague .............. G01R 1/0416 361/679.41 |
| 6,297,955 | B1 | * | 10/2001 | Frank, Jr. .................. G06F 1/18 361/679.41 |
| 6,331,934 | B1 | * | 12/2001 | Helot .................... G06F 1/1632 361/679.41 |
| 6,418,013 | B1 | * | 7/2002 | Broder .................. G06F 1/1632 361/679.58 |

(Continued)

OTHER PUBLICATIONS

Non-Final Office Action mailed Jun. 19, 2014 in U.S. Appl. No. 13/654,302, 4 pages.

(Continued)

*Primary Examiner* — David García Cervetti
(74) *Attorney, Agent, or Firm* — Toler Law Group, PC

(57) ABSTRACT

A securing apparatus includes a security adapter configured to be engaged with an electronic device. The security adapter includes an interface to couple to a host device. The securing apparatus further includes a securing structure that is lockable. When the security adapter is engaged with the electronic device, the securing structure is configurable to transition from an unlocked configuration to a locked configuration to constrain communication of one or more requests from the host device for read access or write access to the electronic device, such that the communication between the host device and the electronic device occurs via the security adapter.

47 Claims, 21 Drawing Sheets

(56) References Cited

U.S. PATENT DOCUMENTS

| | | | | |
|---|---|---|---|---|
| 6,442,637 B1* | 8/2002 | Hawkins | G06F 1/1626 | 361/679.41 |
| 6,586,957 B1* | 7/2003 | Hunter | H01R 13/631 | 324/750.25 |
| 6,618,259 B1* | 9/2003 | Hood, III | G06K 13/0825 | 361/726 |
| 6,669,248 B2* | 12/2003 | Shirase | B60N 3/102 | 292/300 |
| 6,699,128 B1* | 3/2004 | Beadell | G07F 17/32 | 292/106 |
| 6,768,652 B2* | 7/2004 | DeLuga | G06F 1/1632 | 361/679.41 |
| 6,808,400 B2 | 10/2004 | Tu | | |
| 6,893,242 B2 | 5/2005 | Yang et al. | | |
| 7,013,163 B2* | 3/2006 | Jaggers | H02J 7/0044 | 361/679.21 |
| 7,014,490 B1 | 3/2006 | Morikawa et al. | | |
| 7,025,636 B2 | 4/2006 | Allen | | |
| 7,076,270 B2* | 7/2006 | Jaggers | H04M 1/72527 | 379/428.03 |
| 7,160,137 B1 | 1/2007 | Yeh | | |
| 7,183,744 B2* | 2/2007 | Fan | H01M 2/1022 | 320/112 |
| 7,192,295 B1* | 3/2007 | Yeh | H01R 13/6275 | 439/350 |
| 7,256,990 B2* | 8/2007 | Grunow | G06F 1/1632 | 361/679.41 |
| 7,270,560 B1* | 9/2007 | Bodmann | H01R 13/506 | 439/355 |
| 7,298,611 B1* | 11/2007 | Carnevali | G06F 1/1632 | 361/679.55 |
| 7,390,201 B1 | 6/2008 | Quinby et al. | | |
| 7,448,915 B2 | 11/2008 | Chou | | |
| 7,465,181 B1* | 12/2008 | Bridges | H01R 13/6271 | 439/133 |
| 7,522,407 B2* | 4/2009 | Griffith | G06F 1/1632 | 361/679.41 |
| 7,578,691 B2 | 8/2009 | Weksler et al. | | |
| 7,591,018 B1* | 9/2009 | Lee | G06F 21/567 | 726/24 |
| 7,635,272 B2* | 12/2009 | Poppe | H01R 13/6397 | 439/133 |
| 7,689,231 B2 | 3/2010 | Mardiks et al. | | |
| 7,722,369 B2 | 5/2010 | Bushby | | |
| 7,901,250 B2 | 3/2011 | Lam et al. | | |
| 7,938,863 B2* | 5/2011 | Skinner | G06F 21/78 | 206/307 |
| 7,955,111 B2* | 6/2011 | Costabel | F16B 5/0628 | 439/287 |
| 7,978,466 B2* | 7/2011 | Lewandowski | G06F 1/1632 | 361/679.41 |
| 7,997,914 B2* | 8/2011 | Bychkov | G06K 13/0806 | 439/159 |
| 8,075,331 B2* | 12/2011 | Gazelot | H01R 13/635 | 439/353 |
| 8,092,241 B2 | 1/2012 | Chang | | |
| 8,100,441 B2* | 1/2012 | Liao | E05C 19/022 | 292/300 |
| 8,179,672 B2* | 5/2012 | Carnevali | G06F 1/1632 | 361/679.41 |
| 8,190,783 B2* | 5/2012 | Elmer | G06F 3/038 | 710/1 |
| D673,156 S * | 12/2012 | Detemple | D14/434 | |
| 8,348,693 B2* | 1/2013 | Stowers | H01R 12/724 | 439/364 |
| D676,447 S * | 2/2013 | Detemple | D14/434 | |
| 8,392,539 B1* | 3/2013 | Chen | G06F 9/4406 | 709/220 |
| 8,472,168 B2* | 6/2013 | Su | G06F 1/1626 | 361/679.01 |
| 8,529,283 B1 | 9/2013 | Carden | | |
| 8,634,189 B2* | 1/2014 | Escamilla | G06F 1/1632 | 361/679.32 |
| 8,634,203 B2* | 1/2014 | Yu | F16B 5/0016 | 361/785 |
| 8,682,387 B2* | 3/2014 | Ryann | H04M 1/72527 | 361/679.41 |
| 8,992,241 B2* | 3/2015 | Genest | H01R 13/627 | 439/248 |
| 2002/0113996 A1* | 8/2002 | Minakuti | H04N 1/00278 | 358/1.15 |
| 2003/0232547 A1* | 12/2003 | Reiss | H04L 12/2801 | 439/894 |
| 2005/0009404 A1 | 1/2005 | Lee | | |
| 2005/0050366 A1* | 3/2005 | Kwok | G06F 21/32 | 726/19 |
| 2005/0076182 A1* | 4/2005 | Minne | G06F 21/32 | 711/163 |
| 2005/0123113 A1* | 6/2005 | Horn | G06F 21/85 | 379/199 |
| 2005/0285716 A1* | 12/2005 | Denison | G07F 11/002 | 340/5.2 |
| 2006/0026689 A1* | 2/2006 | Barker | G06F 21/31 | 726/26 |
| 2006/0053241 A1* | 3/2006 | Lin | G06K 19/0719 | 710/301 |
| 2006/0136575 A1* | 6/2006 | Payne | G07C 9/00087 | 709/219 |
| 2006/0246840 A1* | 11/2006 | Borowski | G06K 7/10306 | 455/41.2 |
| 2007/0016965 A1* | 1/2007 | Dan | G06F 21/78 | 726/34 |
| 2007/0037454 A1* | 2/2007 | Bushby | H01R 13/6397 | 439/680 |
| 2007/0038827 A1* | 2/2007 | Inooka | G06F 21/445 | 711/163 |
| 2007/0070832 A1* | 3/2007 | Paikattu | G06F 3/0605 | 369/30.32 |
| 2007/0072474 A1* | 3/2007 | Beasley | H02J 7/0042 | 439/332 |
| 2007/0167039 A1* | 7/2007 | Wu | G06F 1/1613 | 439/76.1 |
| 2007/0174916 A1* | 7/2007 | Ching | G06F 21/606 | 726/24 |
| 2008/0028118 A1* | 1/2008 | Sayers | G06F 1/1632 | 710/303 |
| 2008/0028146 A1* | 1/2008 | Dan | G06F 21/79 | 711/115 |
| 2008/0052770 A1* | 2/2008 | Ali | G06F 21/34 | 726/9 |
| 2008/0066174 A1* | 3/2008 | Miller | G06F 21/78 | 726/19 |
| 2008/0098470 A1* | 4/2008 | Danre | H04L 63/0853 | 726/9 |
| 2008/0209965 A1* | 9/2008 | Maack | G06F 21/554 | 70/262 |
| 2008/0215841 A1* | 9/2008 | Bolotin | G06F 1/1632 | 711/164 |
| 2009/0042433 A1* | 2/2009 | Bushby | H01R 13/4538 | 439/352 |
| 2009/0064314 A1* | 3/2009 | Lee | G06F 21/629 | 726/17 |
| 2009/0108988 A1* | 4/2009 | Cleveland | E05B 47/06 | 340/5.52 |
| 2009/0113093 A1 | 4/2009 | Chen | | |
| 2009/0113128 A1* | 4/2009 | Zhao | G06F 21/57 | 711/115 |
| 2009/0145184 A1* | 6/2009 | Cheaz | E05B 73/0005 | 70/266 |
| 2009/0298325 A1* | 12/2009 | Jonker | H01R 13/60 | 439/501 |
| 2010/0031336 A1* | 2/2010 | Dumont | G06F 21/32 | 726/9 |
| 2010/0115634 A1* | 5/2010 | Chung | G06F 21/86 | 726/35 |
| 2010/0235575 A1* | 9/2010 | Yasaki | G06F 21/554 | 711/115 |
| 2010/0311283 A1* | 12/2010 | Desrosiers | H01R 13/639 | 439/680 |
| 2011/0003495 A1 | 1/2011 | Kuo | | |
| 2011/0008981 A1* | 1/2011 | McSweeney | H01R 13/44 | 439/135 |
| 2011/0008986 A1* | 1/2011 | Thom | H01R 13/62933 | 439/347 |

(56) References Cited

U.S. PATENT DOCUMENTS

| | | | | |
|---|---|---|---|---|
| 2011/0029721 | A1* | 2/2011 | Yu | G06F 21/79 |
| | | | | 711/103 |
| 2011/0084799 | A1* | 4/2011 | Ficko | G07C 9/00904 |
| | | | | 340/5.65 |
| 2011/0261546 | A1* | 10/2011 | Smyth | G06F 1/1632 |
| | | | | 361/807 |
| 2012/0011366 | A1* | 1/2012 | Denison | G07C 9/00571 |
| | | | | 713/170 |
| 2012/0011367 | A1* | 1/2012 | Denison | G07C 9/00571 |
| | | | | 713/170 |
| 2012/0244737 | A1 | 9/2012 | Becavin et al. | |
| 2013/0027177 | A1* | 1/2013 | Denison | G07F 11/002 |
| | | | | 340/5.23 |
| 2013/0061311 | A1* | 3/2013 | Whitmyer, Jr. | H04W 12/12 |
| | | | | 726/9 |
| 2013/0179610 | A1* | 7/2013 | Smurthwaite | H01R 13/665 |
| | | | | 710/63 |
| 2013/0196527 | A1* | 8/2013 | Joe | H01R 13/6395 |
| | | | | 439/296 |
| 2014/0095822 | A1* | 4/2014 | Shiga | G06F 12/1441 |
| | | | | 711/163 |
| 2015/0020189 | A1* | 1/2015 | Soffer | G02F 21/85 |
| | | | | 726/16 |

OTHER PUBLICATIONS

Notice of Allowance and Fees Due mailed Oct. 10, 2014 in U.S. Appl. No. 13/654,302, 7 pages.

"Computer System Security Updates," Rockwell Automation, www.rockwellautomation.com, Oct. 2009, 11 pages.

IEEE Standard for Authentication in Host Attachments of Transient Storage Devices, IEEE Standard 1667-2009, IEEE Computer Society, Mar. 26, 2010, 127 pages.

USB Disabler Pro, IntelliAdmin, http://www.intelliadmin.com/index.php/usb-disabler-pro, printed Oct. 17, 2012, 3 pages.

Non-Final Office Action mailed Mar. 4, 2014 in U.S. Appl. No. 13/654,302, 4 pages.

* cited by examiner

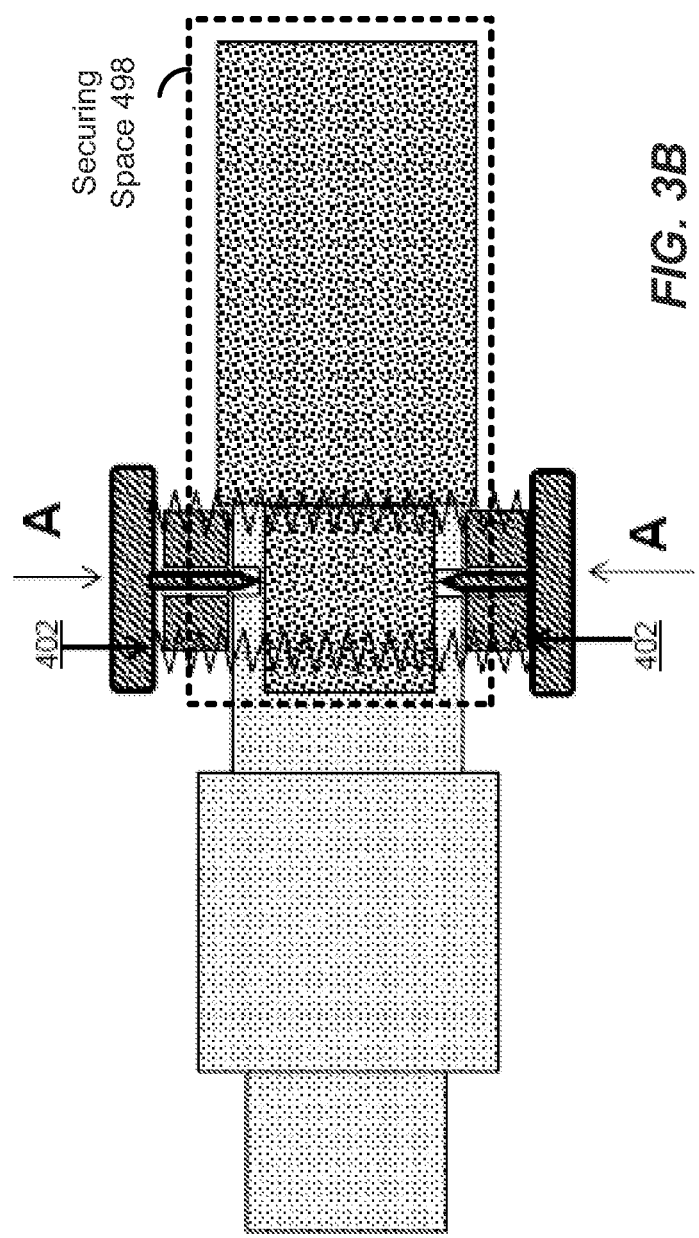

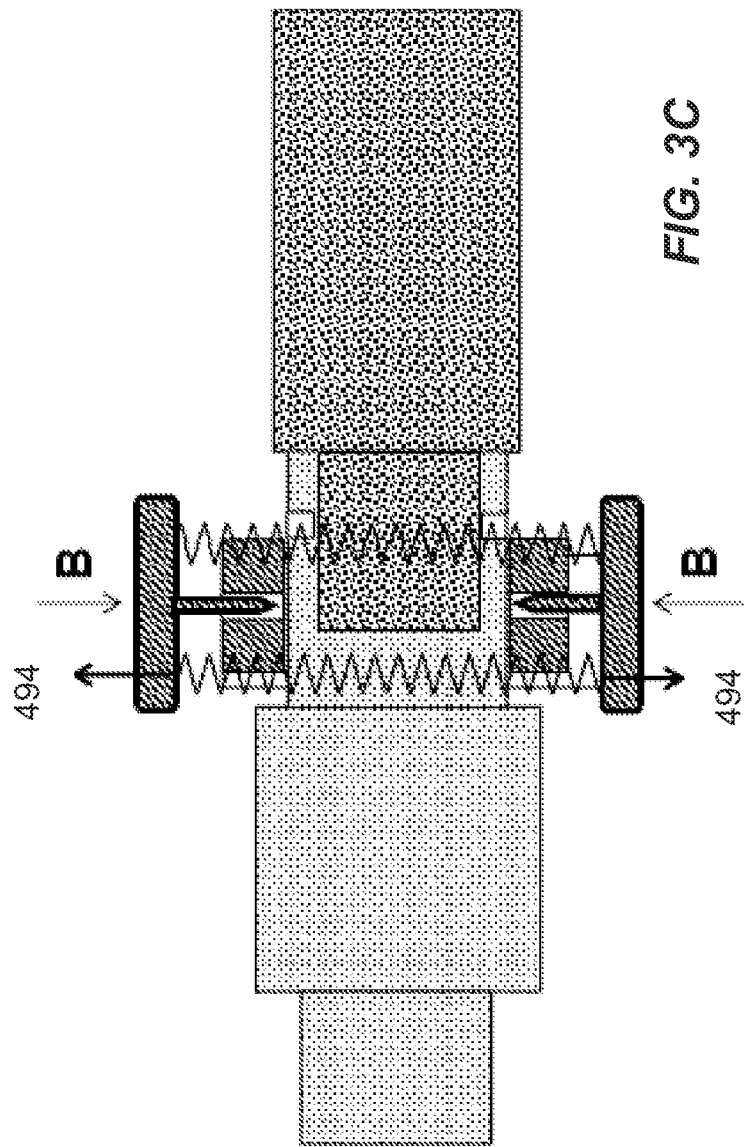

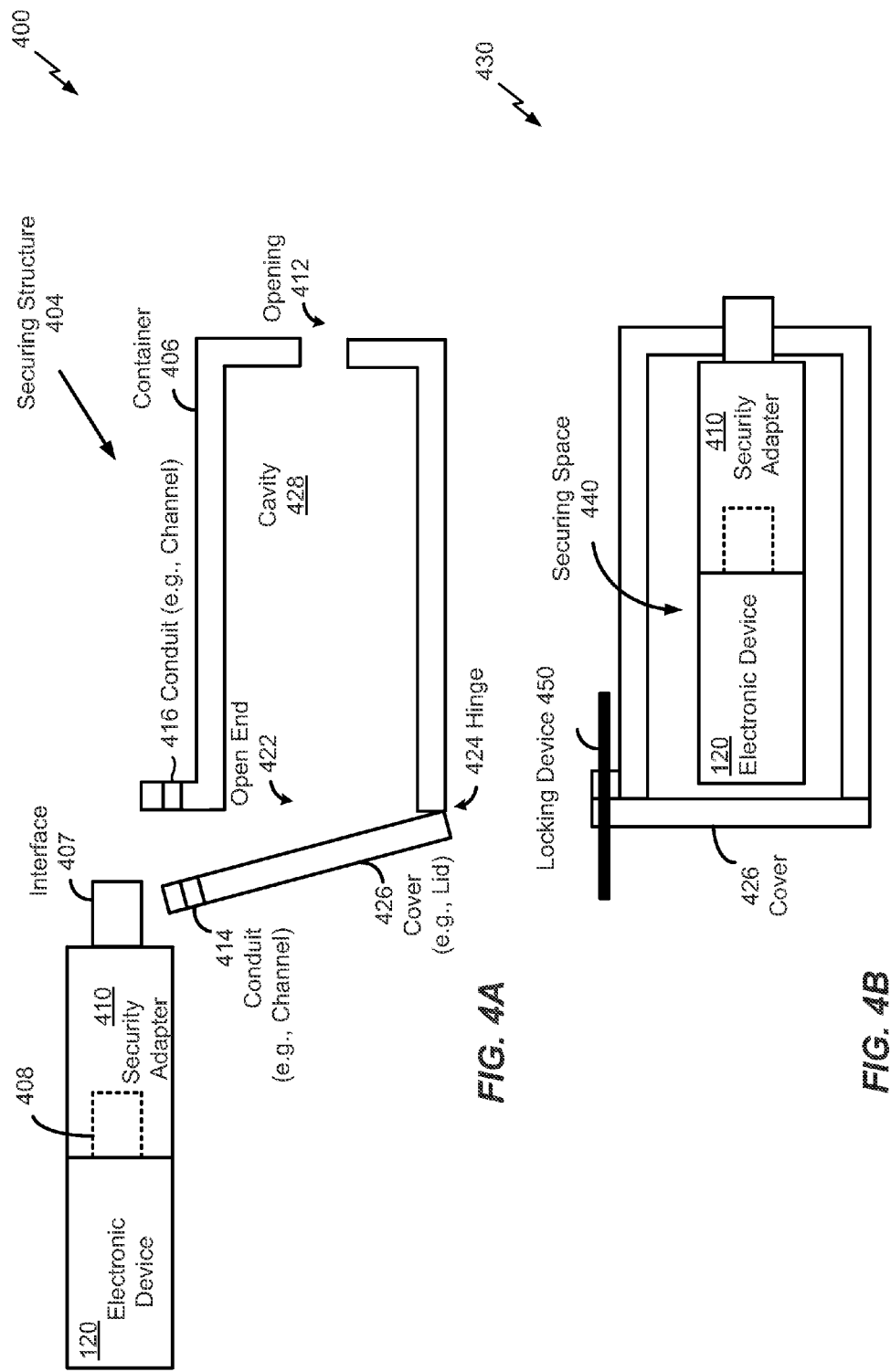

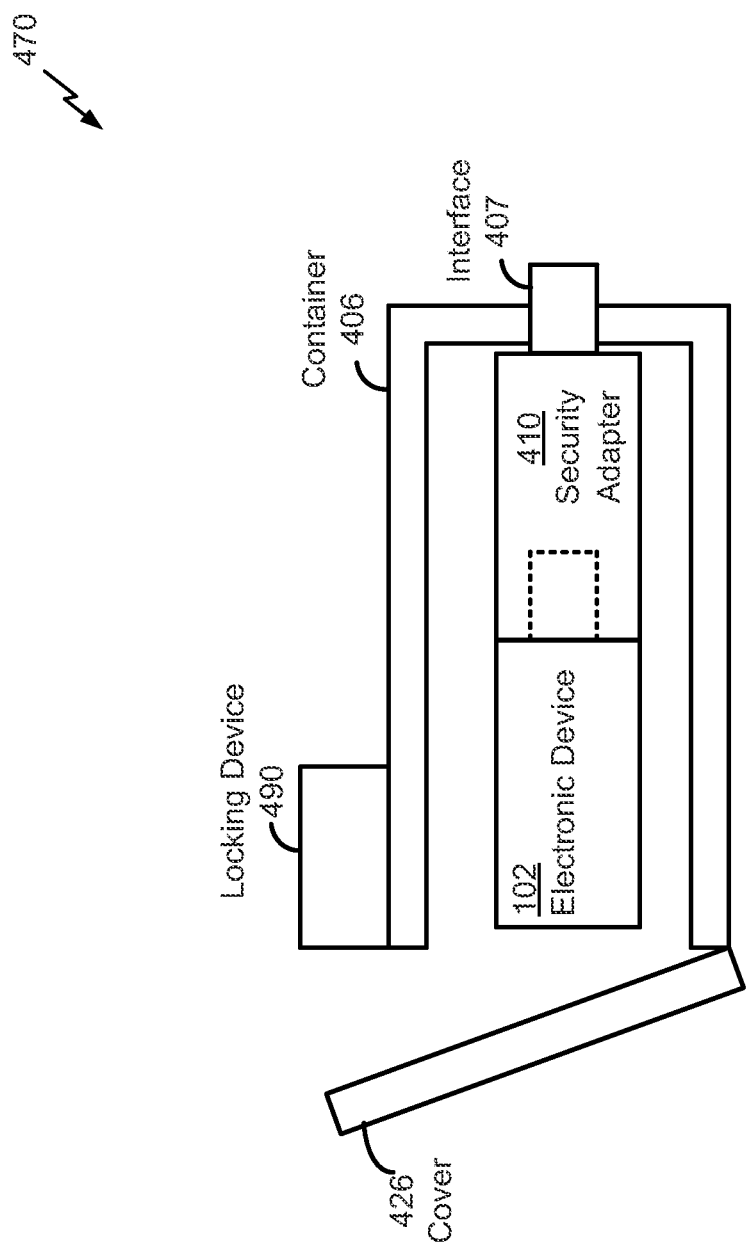

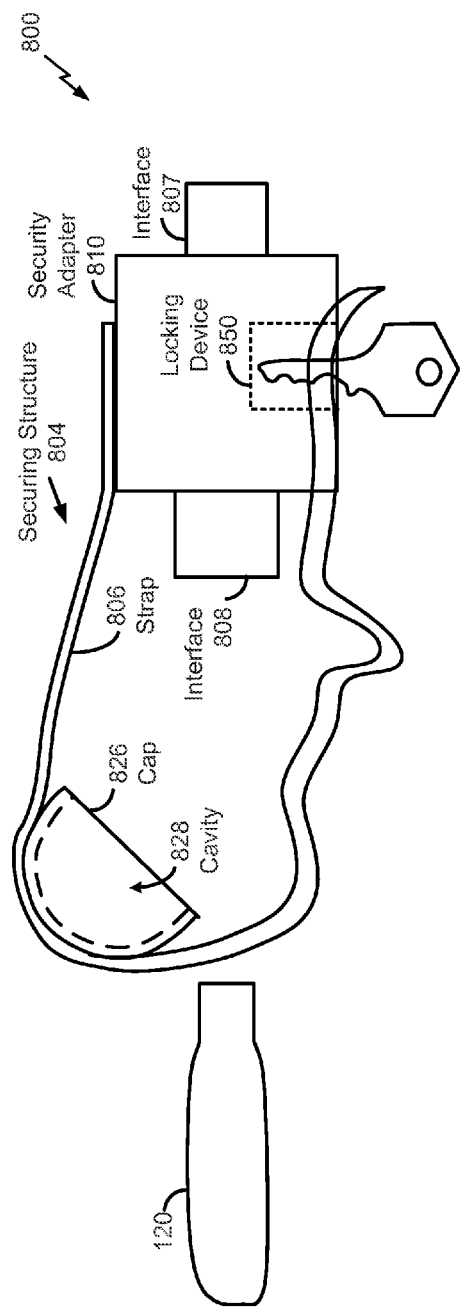
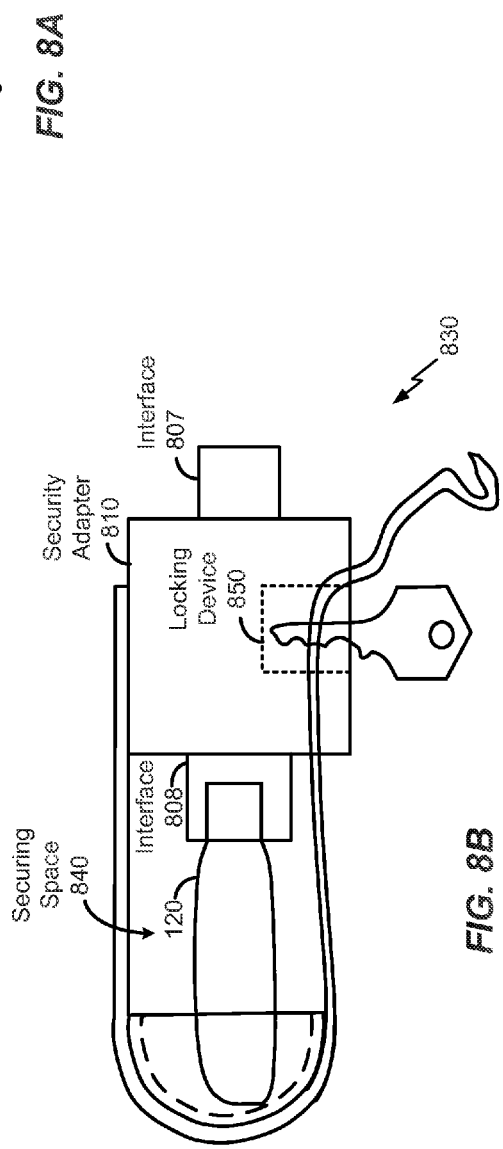

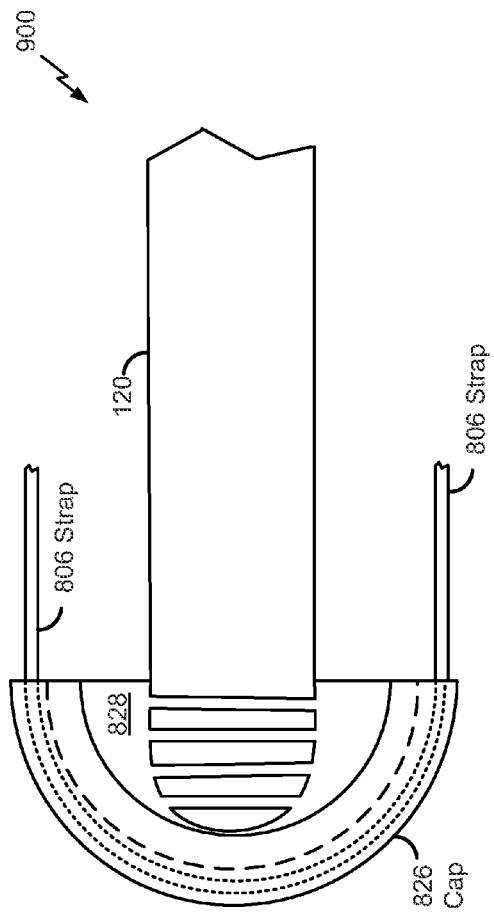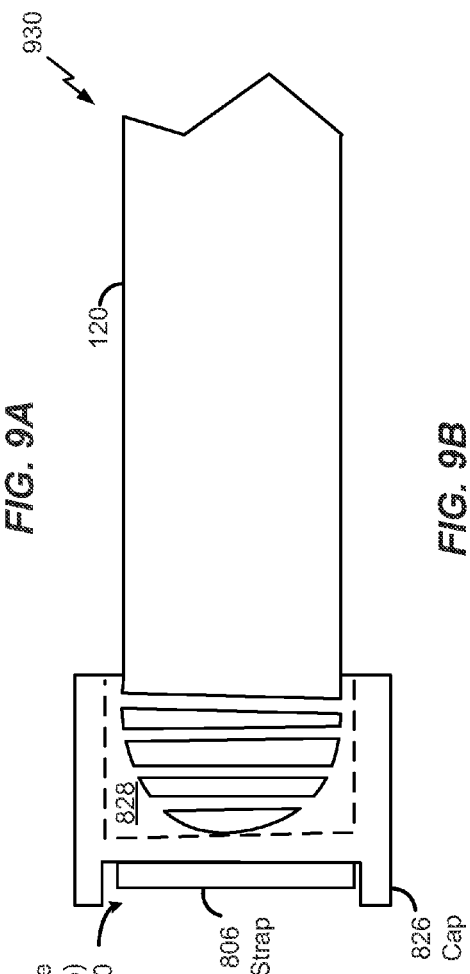

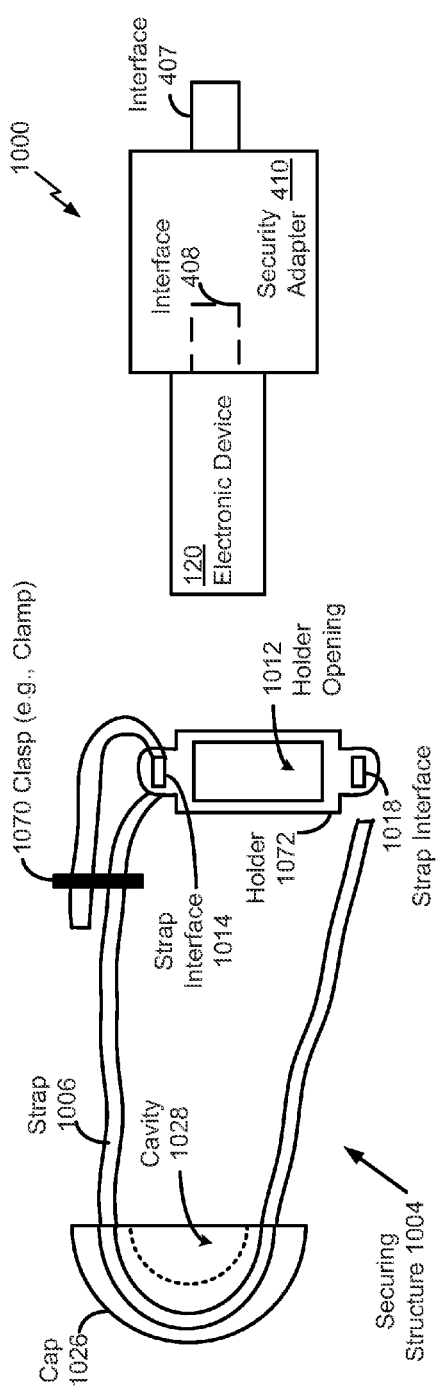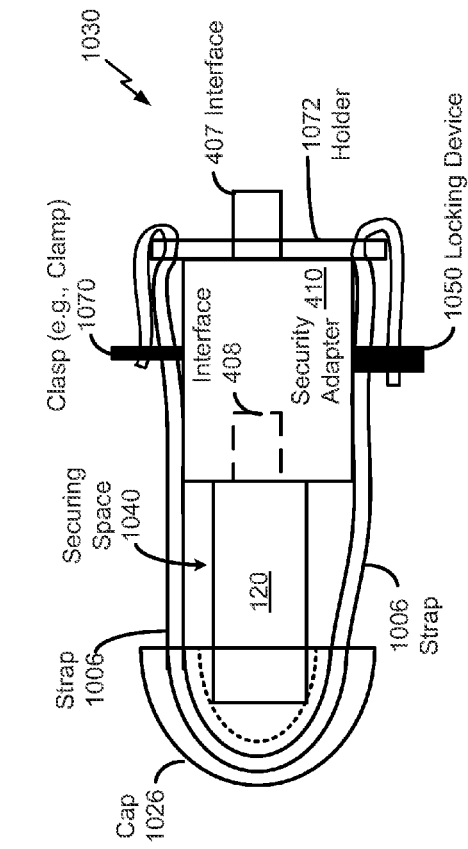

SECURING ACCESS OF REMOVABLE MEDIA DEVICES

CROSS-REFERENCE TO RELATED APPLICATIONS

This patent application is a continuation-in-part of and claims priority from U.S. patent application Ser. No. 13/654,302 filed Oct. 17, 2012, now U.S. Pat. No. 8,956,173, the content of which is incorporated by reference herein in its entirety.

FIELD OF THE DISCLOSURE

The present disclosure is generally related to securing access of removable media devices.

BACKGROUND

Universal Serial Bus (USB) flash drives (UFDs) are well known portable removable electronic devices in the art of computer engineering for storing and porting digital information from one host computer to another. However, unauthorized and unmonitored use of UFDs and other such electronic devices pose many security risks to military installations, business enterprises, educational institutes, and other such organizations. Their small size, high capacity, and ubiquity make them an easy vehicle for unlawful transfer of data to and from a network of an organization.

Organizations choose to deal with such a scenario in different ways. For example, some organizations provide guest users a specific Enterprise USB drive embedded with a special security software application. Other organizations completely ban users from using USB drives and other removable media devices within networks of their organization. However, such approaches may be too restrictive and hard to enforce.

Hence, there is a need to provide a more creative and innovative way to ensure that information systems remain secure, yet allow users to transfer data to and from such systems freely and easily when authorized to do so.

SUMMARY

Embodiments of the present disclosure are defined by the claims, which should be accorded the widest scope and not limited by anything in this section. As a brief introduction, embodiments described in this document and illustrated in the attached drawings generally relate to a security adapter for an electronic device that, when mounted to a host configured to facilitate device identification, may be utilized to implement device-host authentication and to control data and user access.

The security adapter may include a body and two connectors, such as a male connector and a female connector. The male connector may be at least capable of engaging with a host (e.g., a host device) and the female connector may be configured to be at least capable of engaging with an electronic device, such as a data storage device.

The security adapter may also include an interlocking structure that is associated with the female connector and configured to have a first position and a second position, such as a locked position and an unlocked position, respectively. In the first position, the interlocking structure may be configured to lock an unlocked engagement of the interlocking structure to the female connector. In the second position, the interlocking structure may be configured to unlock a locked engagement of the interlocking structure to the female connector.

The security adapter may be associated with a securing structure. The securing structure may be configurable in a secured configuration (e.g., a locked configuration) and an unsecured configuration (e.g., an unlocked configuration). For example, when the security adapter is coupled to the electronic device, the securing structure is configurable to transition from the unlocked configuration to the locked configuration. When the securing structure is in the locked configuration, another electronic device is prohibited from being coupled to the security adapter without first configuring the securing structure in an unlocked configuration (e.g., without destroying or damaging the securing structure, such as breaking the securing structure into multiple parts). Accordingly, when the securing structure is in the locked configuration, the electronic device cannot be "swapped" with a different electronic device. The securing structure in the locked configuration may securely couple the electronic device to the security adapter. Alternatively, the securing structure in the locked configuration may permit the electronic device to be communicatively decoupled from an interface of the security adapter, but the security structure in the locked configuration may still not enable another electronic device to be connected to the interface of the security adapter.

When the securing structure is in the locked configuration, communication of one or more requests from the host device for read access or write access to the electronic device may be constrained, such that the communication between the host device and the electronic device occurs via the security adapter. The communication (e.g., the requests from the host device for read access or write access to the electronic device) may include requests by the host device, requests from applications running on the host device, or requests from a remote device that is channeled via the host device. To illustrate, the securing structure in the locked configuration may restrict data transfer from occurring between the electronic device and another device via the security adapter.

The security adapter may further include electronic circuitry operative to identify the security adapter to the host. With the electronic device and the host operatively coupled via the security adapter, the electronic circuitry may identify the security adapter to the host for securing user access and data access between the electronic device and the host.

The security adapter, when mounted to a host, may be configured to communicate with an access control application running on the host for facilitating authentication with the host. In an illustrative embodiment, with the electronic device and the host operatively coupled via the security adapter, the electronic circuitry may identify the security adapter to the host for securing user access and data access between the electronic device and the host. The access control application may reside on the host and may be executed directly from the host or loaded onto the host, such as from a server over a networked system environment, for running on (e.g., execution by) the host.

Communication between the access control application running on the host and the electronic circuitry of the security adapter may allow the access control application to identify the security adapter to the host. Once identified, the access control application may provide for controlled data storage and transfer operations between the host and an electronic device, such as a universal serial bus (USB) flash drive (UFD), that is coupled (e.g., connected) to the security adapter.

Such controlled user and data operations may involve controlling (e.g., restricting, conditioning, or monitoring) login operations, data storage operations (e.g., read operations and/or write operations), data access and data transfer in and out of the host, and/or other user and data operations that are commenced between the host and the security adapter.

More specifically, the access control application may interact with the electronic circuitry of the security adapter. For example, the access control application may analyze a type of command and required operation received by the access control application (e.g., the host) from the connectable electronic device via the security adapter. Once an operation, such as a login operation or a data access operation, is analyzed with respect to data residing on the host and/or the electronic device, the required operation may be handled by the access control application accordingly.

The access control application may carry out a variety of response mechanisms (e.g., one or more security functions) for controlling user operations and data operations between the host and the electronic device, such as user operations and data operations that occur via the security adapter. The response mechanisms may include denying access of the electronic device to the host, restricting the electronic device access to certain types of data and/or data locations on the host, such as restricting reading or writing to only certain types of files, allowing the electronic device access to data residing on the host, or allowing the electronic device access to certain portions of the host. For example, the response mechanisms may deny the electronic device access to secure data (e.g., legal documents and/or human resource documents) residing on the host.

The access control application or a controller of the security adapter may perform the one or more security functions to prevent unauthorized access to the host device by the electronic device, such as unauthorized access directly from the electronic device to the host or unauthorized access from the electronic device to the host via the security adapter. As an illustrative example, the one or more security functions may include receiving an identifier of the host device and comparing the identifier to an access list stored at the security adapter or populating a log based on access requests or data transfers between the electronic device and the host device via the security adapter, as illustrative, non-limiting examples. The one or more security functions may also include executing an antivirus application on incoming data to be stored at the security adapter or the electronic device or on data to be read from the security adapter or from the electronic device, encrypting data transferred between the electronic device and the host device via the security adapter, initiating the host device to present a prompt for a password to enable data to be transferred from the electronic device to the host device via the security adapter, or updating a security policy stored at the security adapter, as illustrative, non-limiting examples.

By having the host device verify an identity of the security adapter to enable communication with the electronic device, a controlling party (e.g., an owner and/or operator) of the host device may advantageously control access to the host device by one or more electronic devices. Additionally or alternatively, the securing structure may control communication between the electronic device and another device. For example, the securing structure may constrain communication (e.g., one or more requests for read access or write access), such that the communication occurs to the electronic device via the security adapter. To illustrate, when the securing structure is in the locked configuration (e.g., after the controlling party has authorized the electronic device to be operated with the host device via the security adapter), the securing structure may prevent the electronic device from communicating directly with another device, such that communications to and from the electronic device pass through the security adapter. For example, when the securing structure is in the locked configuration, another electronic device is prohibited from being coupled to the security adapter without first configuring the securing structure in an unlocked configuration (e.g., without destroying, distorting, or damaging the securing structure, the electronic device, or the security adapter, such as breaking or distorting the securing structure or the electronic device to force the securing structure into an unlocked configuration or to forcibly remove the electronic device from the securing structure that is in the locked configuration). Accordingly, when the securing structure is in the locked configuration, the electronic device cannot be "swapped" with a different electronic device. By controlling use of the electronic device and by controlling access to the host device, information (e.g., data) accessible via the host device may remain secure and may be accessed only by electronic devices that communicate via an authorized security adapter. Accordingly, data access, including data storage and data transfer, to and from the host device and one or more connectable electronic devices, may be controlled.

These and other embodiments, features, aspects, and advantages of the present disclosure will become better understood after review of the entire application, including the following sections: Brief Description of the Drawings, Detailed Description, and the Claims.

BRIEF DESCRIPTION OF THE DRAWINGS

The accompanying drawings, which are incorporated in and constitute a part of this specification, illustrate various aspects of the disclosure and, together with the description, serve to explain principles of the disclosure. Wherever convenient, the same reference numbers will be used throughout the drawings to refer to the same or like features.

FIG. 3B is a second diagram of the first illustrative example of the security adapter of FIG. 1B;

FIG. 3C is a third diagram of the first illustrative example of the security adapter of FIG. 1B;

FIGS. 4A-B are views of an illustrative embodiment of a securing structure;

FIG. 4C is a view of an illustrative embodiment of the securing structure of FIGS. 4A-B including a locking device;

FIGS. 8A-B are views of an illustrative embodiment of a securing structure;

FIGS. 9A-B are views of an illustrative embodiment of the securing structure of FIGS. 8A-B illustrating a cap;

FIGS. 10A-B are views of an illustrative embodiment of a securing structure;

DETAILED DESCRIPTION

Figure 1A:
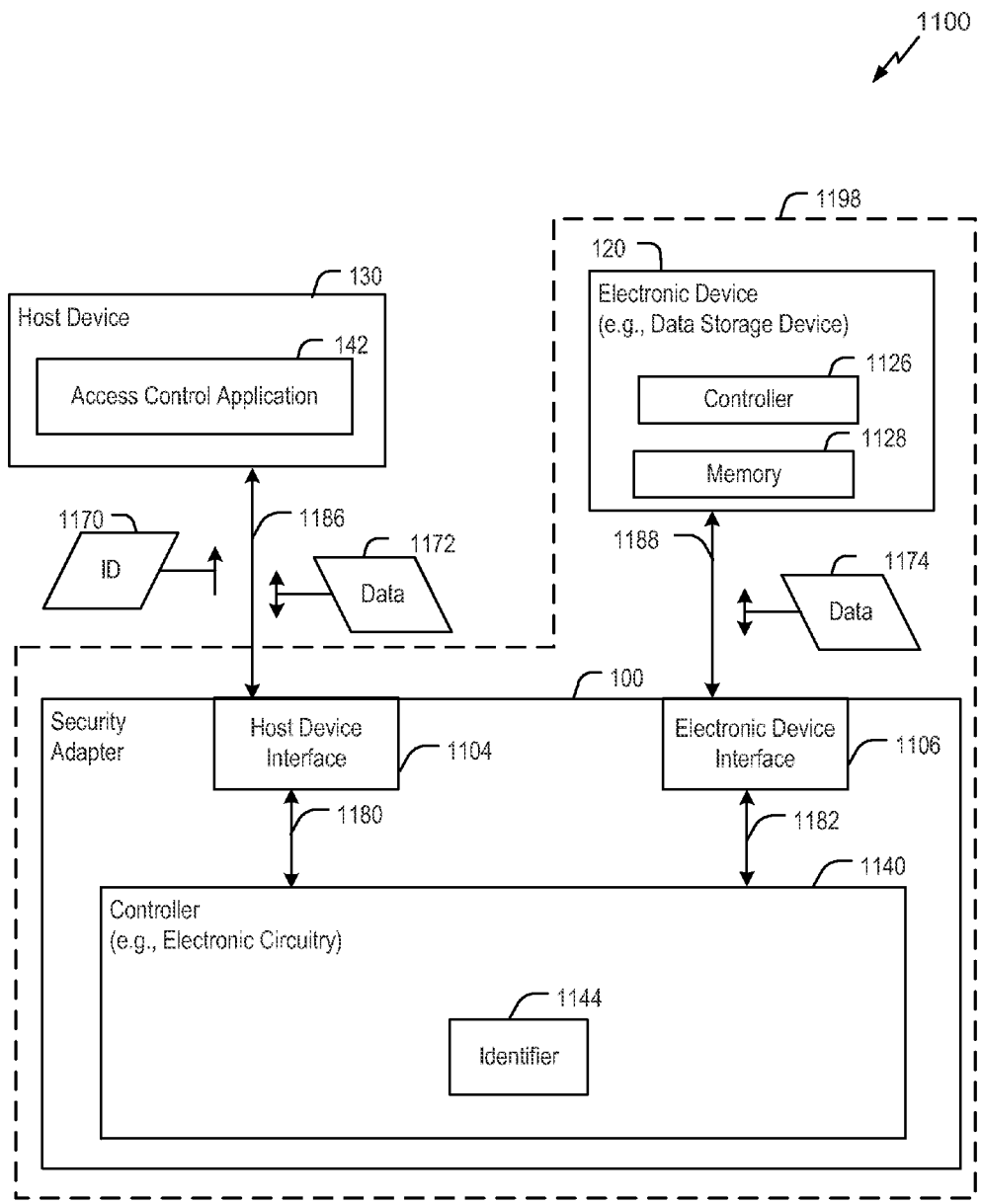
FIG. 1A illustrates a first system with a security adapter for engaging with an electronic device and a host device.

Various modifications to and equivalents of the embodiments described and shown are possible and various generic principles defined herein may be applied to these and other embodiments. Thus, the claims are to be accorded the widest scope consistent with the principles, features, and teachings disclosed herein.

Particular embodiments of the present disclosure are described below with reference to the drawings. In the description, common features are designated by common reference numbers throughout the drawings.

The disclosed embodiments described herein are based, in part, on the observation that unauthorized and unmonitored use of universal serial bus (USB) flash devices (UFDs) and other such removable electronic devices pose many security risks, among other issues, to computer systems of military installations, business enterprises, educational institutes, and other such organizations. In an illustrative use case scenario, unauthorized and unmonitored use of an electronic device with a computer system of an academic institution, for example, may lead to unauthorized use (e.g., accessing files) of the electronic device, such as for the purpose of reading unauthorized information during a university examination.

Some security risks may result from intentional or unintentional use of restricted files, such as confidential information and copyrighted information. For example, unauthorized use may include copying information from a computer system to a connectable electronic device. As another example, such use may include installing unauthorized content on the computer system, or introducing malicious data and/or other malware to the computer system. Additionally or alternatively, when a connectable electronic device, such as a storage device in a form of a UFD device, is inserted into (coupled with) any of one or more personal computers (PCs) of an organization, there is no way to identify and authenticate the owner of the UFD device.

Hence, in order to ensure that computer systems remain secure and are accessed properly, there is a need to provide a way to control data access, including data storage and data transfer, to and from such computer systems and connectable electronic devices.

One embodiment of this disclosure provides a security adapter for an electronic device, such as a Universal Serial Bus (USB) flash drive (UFD). The security adapter may be attached to the electronic device prior to mounting the electronic device into a host for securing user access and data access to and from the electronic device. For example, the security adapter may secure user access (e.g., allowing access only by authorized users) and data access (e.g., allowing access only to designated data) between the electronic device and the host. The security adapter may include a body, two connectors, such as a female connector and a male connector, typically one on each side of the body, and an interlocking structure. The interlocking structure may be associated with the female connector and may be configured to have first and second positions. For example, in the first position, the interlocking structure is configured to lock an unlocked engagement of the interlocking structure to the female connector and, in the second position, the interlocking structure unlocks a locked engagement of the interlocking structure to the female connector.

When the male connector is mounted to the host, electronic circuitry of the security adapter may be operative to identify the security adapter to the host. With the electronic device and the host operatively coupled via the security adapter, the electronic circuitry may identify the security adapter to the host for controlling user access operations and data access operations between the electronic device and the host.

Referring to FIG. 1A, a system 1100 including a security adapter for engaging with an electronic device and a host device is depicted. For example, the system 1100 may include the security adapter 100 configured to engage one or more electronic devices, such as an electronic device 120, and one or more host devices, such as a host device 130.

The host device 130 may include a mobile telephone, a music player, a video player, a gaming console, an electronic book reader, a personal digital assistant (PDA), a computer, such as a laptop computer, a notebook computer, or a tablet computer, any other electronic device, or any combination thereof. The host device 130 may be included in or coupled to a host network system, as described further herein. As an illustrative, non-limiting example, the host device 130 may be a device that is at risk of being exposed or infected with malicious software or a virus.

The host device 130 may be configured to implement a communication protocol via an interface that enables communication with the security adapter 100, the electronic device 120, or a combination thereof. For example, the host device 130 may operate in compliance with a universal serial bus (USB) standard (or a USB protocol specified by one or more USB standards). As an illustrative, non-limiting example, the host device 130 may be configured to implement a USB protocol via an interface that enables communication with the security adapter 100, the electronic device 120, or a combination thereof.

The host device 130 may include an access control application 142. The access control application 142 may include computer readable program code that, when executed by the host device 130, may cause the host device 130 to interact with the security adapter 100 for receiving data and commands from the electronic device 120. For example, the access control application 142 may receive the data and the commands from the electronic device 120 via electronic circuitry of the security adapter 100. Additionally or alternatively, the access control application 142 may issue one or more requests for read access or write access to the electronic device 120, such as one or more requests issued to the electronic device 120 via the security adapter. Operation of the access control application 142 is described further with reference to FIG. 1B.

The access control application 142 may reside on the host device 130 and may be executed by the host device 130. Alternatively or additionally, the access control application 142 may be an executable file that is loaded onto the host device 130 from a host network system, from the security adapter 100, from the electronic device 120, or a combination thereof. The access control application 142 may include dedicated circuitry, an application of a processor running at the host device 130 (e.g., a processor of a controller), or a combination of dedicated circuitry and an executing application. For example, a processor running at the host device 130 may execute one or more instructions that cause the processor to execute one or more operations.

The access control application 142 may be configured to authorize and/or control user access operations and data access operations, illustrated as data 1172 in FIG. 1A, between the electronic device 120 and the host device 130 via the security adapter 100. For example, the access control application 142 may control (e.g., restrict, condition, monitor, constrain, limit, prohibit, prevent, enable, authorize) login operations, data storage operations (e.g., read and write operations), data access and data transfer in and out of the host device 130, requests, such as requests for read access or write access, and/or other user and data operations that are commenced between the host device 130 and the electronic device 120.

To authorize and/or control the user access operations and data access operations between the electronic device 120 and the host device 130 via the security adapter 100, a security policy, such as a set of rules, may be established that corresponds to the security adapter 100, to the electronic device 120, or a combination thereof. For example, the security policy may indicate a number and/or a type (e.g., such as personal computers) of host devices 130 that the electronic device 120 can communicate with, authorized times for communication between the host device and the electronic device 120, one or more authorized operations (e.g., read file, write file, edit file, etc.), one or more types of data (e.g., secured, protected, read-only) the electronic device 120 is authorized to access, an authorized location of data in a memory (residing on a public partition and/or on a secured partition of the host device 130 or of the host network system), an authorized information transfer rate, one or more other authorized parameters, or a combination thereof. The security policy may be stored at the host device 130 or at a host network system associated with the host device 130, as described with reference to FIG. 13, at the security adapter 100, as described with reference to FIGS. 11 and 12, or at the electronic device 120, as described with reference to FIG. 14.

The access control application 142 may receive an identifier (ID) 1170 from the security adapter 100 when the security adapter 100 is coupled to the host device 130. The host device 130 may identify a particular security policy that corresponds to the security adapter 100 based on the identifier 1170. The access control application 142 may implement the particular security policy corresponding to the security adapter 100 to control communication between the host device 130 and the electronic device 120 via the security adapter 100. For example, the access control application 142 may identify a rule of the set of rules included in the security policy. The access control application 142 may perform one or more security functions based on the rule. The one or more security functions may be applied to data communicated between the host device 130 and the security adapter 100, and/or between the host device 130 and the electronic device 120. As an alternative example, the particular security policy may be implemented by the security adapter 100 or by the electronic device 120. Communication between the access control application 142 and the security adapter 100 is described further with reference to FIG. 2.

The security adapter 100 may include a controller 1140 (e.g., electronic circuitry), a host device interface 1104, and an electronic device interface 1106. The host device interface 1104 may be coupled to the controller 1140 via a bus 1180 and the electronic device interface 1106 may be coupled to the controller 1140 via a bus 1182. The host device interface 1104 may be a physical interface, such as a plug or a socket, or a wireless interface that is configured to enable the security adapter 100 to be communicatively coupled to the host device 130. The electronic device interface 1106 may be a physical interface, such as a plug or a socket, or a wireless interface that is configured to enable the security adapter 100 to be communicatively coupled to the electronic device 120.

The security adapter 100 may be configured to be coupled to the host device 130. For example, the security adapter 100 may be a removable device that may be selectively attached to or removed from the host device 130. As another example, the security adapter 100 may be configured to be coupled to the host device 130 as an embedded device. The security adapter 100 may operate in compliance with a JEDEC industry specification. For example, the security adapter 100 may operate in compliance with a JEDEC eMMC specification, a JEDEC Universal Flash Storage (UFS) specification, one or more other specifications, or a combination thereof.

The host device interface 1104 may be configured to couple the security adapter 100 to one or more host devices, such as the host device 130. When the security adapter 100 is coupled to the host device 130, communication between the host device 130 and the security adapter 100 may occur via a communication path 1186. The electronic device interface 1106 may be configured to couple the security adapter 100 to one or more electronic devices, such as the electronic device 120. For example, the electronic device interface 1106 may include a USB connector to enable communication with the electronic device 120 via a USB connector of the electronic device 120. When the security adapter 100 is coupled to the electronic device 120, communication between the electronic device 120 and the security adapter 100 may occur via a communication path 1188. For example, user access operations and data access operations, illustrated as data 1174 in FIG. 1A, may be communicated between the electronic device 120 and the security adapter 100. The data 1174 may be the same as the data 1172. For example, the host device 130 may send the data 1172 to be communicated to the electronic device 120 via the security adapter 100. The security adapter 100 may receive the data 1172 and provide the data 1172 to the electronic device 120 as the data 1174.

The controller 1140 may include an identifier 1144 associated with the security adapter 100, associated with the electronic device 120, or a combination thereof. When the security adapter 100 couples with the host device 130, the security adapter 100 may send the identifier 1144 to the host device 130 as the ID 1170 to enable communication between the host device 130 and the electronic device 120 via the security adapter 100. The controller 1140 may include dedicated circuitry, an application running at a processor of the security adapter 100 (e.g., a processor of the controller 1140), or a combination of dedicated circuitry and an executing application. For example, the processor running at the controller 1140 may execute one or more instructions that cause the processor to execute one or more operations. For example, the one or more instructions may be stored in a memory of the security adapter 100, as described with reference to FIG. 11.

The security adapter 100 may be associated with a securing structure 1198, as described with reference to FIGS. 1B, 3A-C, 4A-C, 5A-B, 6A-B, 7, 8A-B, 9A-B, and 10A-B. The securing structure 1198 may be configurable to transition between an unlocked configuration and a locked configuration. In the locked configuration the securing structure 1198 may constrain communication of one or more requests from the host device 130 for read access or write access to the electronic device 120 to occur via the security adapter 100. For example, when the securing structure 1198 is in the locked configuration and when the security adapter 100 is coupled to the host device, one or more requests for read access or write access from the host device 130 to the electronic device 100 may be forced to pass through the security adapter 100. To illustrate, the securing structure 1198 in the locked configuration may restrict data transfer between the electronic device and another device to occur via the security adapter. The securing structure 1198 in the locked configuration may securely couple the electronic device 120 to the security adapter 100. For example, when the securing structure 1198 is in the locked configuration and when the security adapter 100 is coupled to the electronic device 120, the securing structure 1198 may prevent removal of the electronic device 120 from the security adapter 100. To illustrate, the electronic device 120 and the security adapter 100 may be viewed as a mated pair when the administrator authorizes the security adapter 100, the electronic device 120, or a combination thereof, to transfer data with the host device 130. The securing structure 1198 may maintain the security adapter 100 and the electronic device 120 as the mated pair after authorization by the administrator. When the securing structure 1198 is in the locked configuration, the electronic device 120 may be restrained by the securing structure 1198 such that another electronic device may not be used with (e.g., physically coupled to) the security adapter 100.

The electronic device 120, such as a data storage device, may include a controller 1126 and a memory 1128, such as a non-volatile memory. The electronic device 120 may be configured to receive user access operations and data access operations, such as by receiving data and/or instructions, from the host device 130 and/or from the security adapter 100, via the controller 1126, for execution by the controller 1126 and/or for storage in the non-volatile memory 1128. The controller 1126 is further configured to send data and commands to the non-volatile memory 1128 and to receive data from the non-volatile memory 1128 via a bus (not shown) included in the electronic device 120. For example, the controller 1126 may be configured to send the data 1174 and a write command to instruct the non-volatile memory 1128 to store the data 1174 to a specified address of the non-volatile memory 1128. As another example, the controller 1126 may be configured to send a read command to read the data 1174 from a specified address of the non-volatile memory 1128.

The electronic device 120 may be configured to be coupled to the host device 130, either directly or via the security adapter 100. For example, the electronic device 120 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the electronic device 120 may be configured to be coupled to the host device 130, directly or via the security adapter 100, as embedded memory (e.g., embedded memory of the host device 130 and/or of the security adapter 100), such as eMMC® (trademark of JEDEC Solid State Technology Association, Arlington, Va.) and eSD, as illustrative examples. To illustrate, the electronic device 120 may correspond to an eMMC (embedded MultiMedia Card) device. The electronic device 120 may operate in compliance with a JEDEC industry specification. For example, the electronic device 120 may operate in compliance with a JEDEC eMMC specification, a JEDEC Universal Flash Storage (UFS) specification, one or more other specifications, or a combination thereof.

During operation, an administrator associated with the host device 130 and/or associated with a host network system that includes or is coupled to the host device 130 may assign the security adapter 100 to the electronic device 120. For example, the administrator may register the security adapter 100, the electronic device 120, or a combination thereof, with the host device 130 by populating or updating a list of authorized security adapters (and/or authorized electronic devices). The list of the authorized adapters may be stored in a memory associated with the host device 130 or the host network system, such as a memory of a server of the host network system or in a storage database of the host network system. The memory of the server may be accessible to the host device 130.

During an assignment and/or a registration of the electronic device 120 to the security adapter 100, the administrator may cause a scan to be performed on the electronic device 120 to check the electronic device 120 for viruses or other potentially harmful software. The security adapter 100 may enable the electronic device 120 to be used in conjunction with the host device 130 and/or the host network system. The list of authorized security adapters may also identify a security policy that corresponds to the security adapter 100, to the electronic device 120, or a combination thereof, and that may be implemented when the security adapter 100 is coupled to the host device 130. For example, the security policy may correspond to or be retrievable based on the identifier 1144.

The security adapter 100 may be coupled to the host device 130, and the host device 130 may detect the security adapter 100 and/or the electronic device 120 and may request the identifier 1144 from the security adapter 100. The security adapter 100 may send the identifier 1144 to the host device 130 as the ID 1170. The host device 130 may authenticate and verify the ID 1170 received from the security adapter 100. For example, the host device 130 may access a list of authorized security adapters and verify that the ID 1170 is included in the list of authorized security adapters. If the ID 1170 is not included in the list of authorized security adapters, the host device 130 may generate an indication that the security adapter 100 and/or the electronic device 120 is not authorized, such as an indication to be presented via a user interface coupled to the host device 130. If the ID 1170 is included in the list of authorized security adapters, the host device 130 may authorize data transfer between the host device 130 and the electronic device 120 via the security adapter 100. For example, after the ID 1170 is authenticated and/or verified by the host device 130, the host device 130 may permit user access operations and data access operations between the host device 130 and the electronic device 120 via the security adapter 100.

When the identifier 1144 is authorized, the host device 130 may retrieve or access the security policy that corresponds to the security adapter 100, the electronic device 120, or a combination thereof. For example, the security policy may be received from the host network system, from the security adapter 100, or from the electronic device 120. The host device 130 may then implement, using the access control application 142, the security policy for data transferred between the host device 130 and the electronic device 120 via the security adapter 100. Alternatively or additionally, the security policy may be implemented by the security adapter 100, by the electronic device 120, or a combination thereof.

Additionally or alternatively, the administrator may assign the identifier 1144 to the security adapter 100 when the security adapter 100, the electronic device 120, or a combination thereof, is registered by the administrator. For example, the identifier 1144 of the security adapter 100 may be encrypted. When the host device 130 requests an identifier from the security adapter 100, the security adapter 100 may provide the ID 1170 that includes the identifier 1144 of the security adapter 100. The identifier 1144 may be used to confirm that only a combination of a particular electronic storage device, such as the electronic device 120, and the security adapter 100 is recognized by the host network system.

As an illustrative example, to make it more difficult for a particular electronic device that is authorized for the security adapter 100 to be swapped with a different electronic device that is not authorized for the security adapter 100, the administrator may also assign a second identifier of the electronic device 120 when the administrator registers the security adapter 100, the electronic device 120, or a combination thereof. The administrator may cause the second identifier to be stored in the memory 1128 of the particular electronic device. For example, the second identifier of the electronic device 120 may be encrypted and/or may not be able to be copied from the electronic device 120 other than by an authorized user (e.g., the administrator) or an authorized device (e.g., the security adapter 100). When the host device 130 requests an identifier from the security adapter 100, the security adapter 100 may provide both the identifier 1144 and the second identifier or may provide a combination based on the identifier 1144 and the second identifier. The identifier 1144 and the second identifier, or the combination, may be used to confirm that only the particular electronic device, such as the electronic device 120 and the security adapter 100, is recognized by the host network system.

By having the host device 130 verify an identity of the security adapter 100 prior to enabling communication with the electronic device 120, a controlling party (e.g., an owner and/or operator) of the host device 130 may advantageously control access to the host device 130 by one or more electronic devices. By controlling access to the host device 130, information (e.g., data) accessible via the host device 130 may remain secure and may be accessed only by electronic devices that communicate via an authorized security adapter 100. Accordingly, data access, including data storage and data transfer, to and from the host device 130 by one or more connectable electronic devices may be controlled.

Figure 1B:
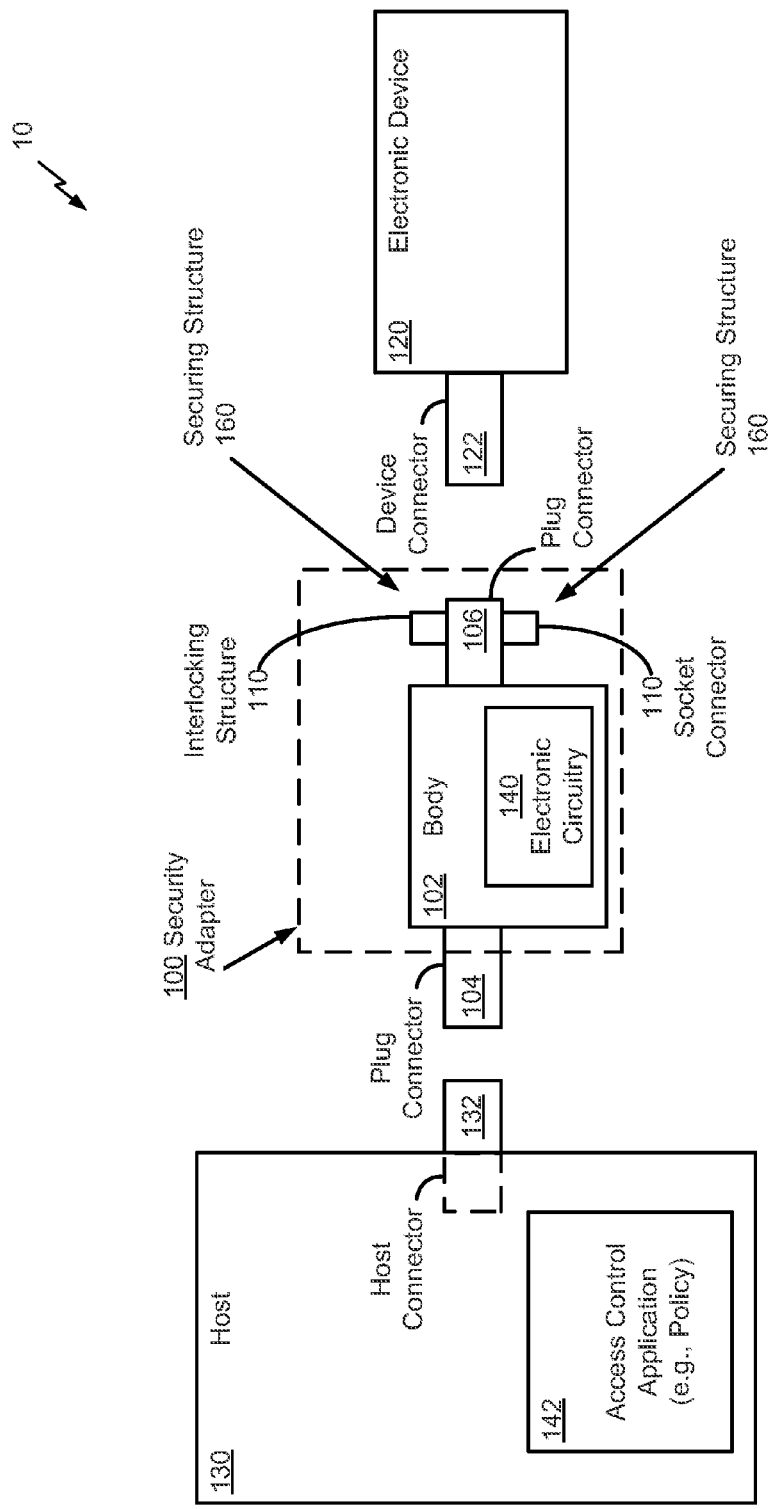
FIG. 1B illustrates a second system with a security adapter for engaging with an electronic device and a host.

Referring to FIG. 1B, a system 10 including an illustrative example of the security adapter 100 of FIG. 1A for connecting between the electronic device 120 and the host 130 (e.g., a host device) is depicted. The electronic device 120, such as a data storage device, may include a controller and a memory, (e.g., a non-volatile memory).

The security adapter 100 may include a body 102 with two connectors, such as a female connector and a male connector. The female connector may be capable of engaging with a device connector 122 of the electronic device 120. The male connector may be configured to couple (e.g., mount) the security adapter 100 to the host 130, such as a desktop computer, via a host connector 132. In general, the body 102 of the security adapter 100 can be designed in any shape suitable to allow two connectors and to allow engaging an electronic device and a host to the security adapter 100 via the respective connectors. The electronic device 120 is typically configured in the form of a mass storage medium, such as a USB flash drive, typically based on a non-volatile flash-based memory technology. Moreover, in a particular embodiment, the two connectors are Universal Serial Bus ("USB") connectors that conform to the USB protocol and the electronic device 120 is a USB mass storage drive designed for connecting to a host. USB is a serial bus standard designed to allow peripherals to be connected to host computers using a single standardized interface socket.

In an embodiment, the security adapter 100 is configured with two connectors that include a male connector (the plug connector 104) and a female connector (the socket connector 106), one on each side of the body 102, in such a way that the male connector; namely, the plug connector 104, is at least capable of engaging with the host 130 and the female connector; namely, the socket connector 106, is at least capable of engaging with the electronic device 120. It should be noted, however, that the language "one on each side of the body" does not necessarily mean that the body 102 is so restricted in its configuration, in that, e.g., the body must have two sides or, if the body does have two sides that these sides are opposite each other, parallel to each other, located in any other configuration relative to each other, or restricted in any other way.

As shown in FIG. 1B, an interlocking structure 110 is associated with the female connector; namely, the socket connector 106, and configured to provide any combination of mechanical and device control functions to interlock with or upon the socket connector 106. More specifically, interlocking structure 110 is configured to have first and second positions. In the first position, the interlocking structure 110 is configured to lock an unlocked engagement of the interlocking structure 110 to the socket connector 106. The interlocking structure 110 may be operable in the first position, for example, upon mounting the security adapter 100 to the electronic device 120. This is typically applied for locking the socket connector 106 to the electronic device 120, such that the electronic device 120 is securely coupled to the security adapter 100. The interlocking structure 110 may include or be included in a securing structure 160, such as the securing structure 1198 of FIG. 1A. For example, the first position may correspond to a locked configuration. When the securing structure 160 is in the locked configuration, communication, such as one or more requests for read access or write access, between the host device 130 and the electronic device 120 may be constrained to occur via the security adapter 100. The communication (e.g., the requests from the host device 130 for read access or write access to the electronic device 120) may include requests by the host device 130, requests from applications running on the host device 130, or requests from a remote device that is channeled via the host device 130. To illustrate, when the securing structure 160 is in the locked configuration, data transfer between the electronic device 120 and another device, such as the host device 130, may be restricted to occur via the security adapter.

In the second position, the interlocking structure 110 is capable of unlocking a locked engagement of the interlocking structure 110 to the socket connector 106 to which the interlocking structure 110 is engaged with. In this second position, with the interlocking structure 110 unlocking the locked engagement of the interlocking structure 110 with the socket connector 106, the interlocking structure 110 may be movable, or slidable about the socket connector 106. Accordingly, the interlocking structure 110 and/or the securing structure 160 may be configurable to transition from an unlocked configuration to a locked configuration and to transition from the locked configuration to the unlocked configuration.

In a typical implementation, the interlocking structure 110 is operative to transition from the first position to the second position conditioned upon external means, such as in the form of a removable structure, which means are of, or are associated with an authorized entity allowing for unlocking a locked engagement of the interlocking structure 110 to the female connector, i.e., socket connector 106. Such configuration allows for securing connection of the interlocking structure 110 in a locked position to the socket connector 106, for example, when the socket connector 106 is engaged with the electronic device 120. Moreover, this allows for selectively preventing removal of the security adapter 100 when engaged with the electronic device 120.

The way in which the security adapter 100 may be configured with the interlocking structure 110 for engaging with an electronic device 120 will be described in more detail in association with FIG. 3A, FIG. 3B, and FIG. 3C.

The security adapter 100 also includes an electronic circuitry 140 that is operative, when the plug connector 104 is mounted to the host 130, to identify the security adapter 100 to the host 130. In an embodiment, with the electronic device 120 and the host 130 operatively coupled via the security adapter 100, the electronic circuitry 140 may identify the security adapter 100 to the host 130 for user access and data access between the electronic device 120 and the host 130. The electronic circuitry 140 may identify the security adapter 100 to the host 130, for example, for securing access to facility and computer systems of an organization. When the male connector 104 is mounted to the host 130, the electronic circuitry 140 of the security adapter 100 may be operative to identify the security adapter 100 to the host 130. With the electronic device 120 and the host 130 operatively coupled via the security adapter 100, the electronic circuitry 140 may identify the security adapter 100 to the host 130 for controlling user access operations and data access operations between the electronic device 120 and the host 130.

The electronic circuitry 140 in the security adapter 100 may communicate with the access control application 142 running on the host 130 to identify the security adapter 100 in front of the host 130. As shown in FIG. 1B, the access control application 142 may reside in the host 130 and may be executed directly from the host 130. Alternatively or optionally, the access control application 142 may be an executable file that is loaded onto the host 130 (for example via the organization network) by using a communications interface.

In general, the access control application 142 may be a computer program employing computer readable program code that, when running on a host, establish rules for controlled user and data operations between the host and a connectable device. More specifically, the access control application 142, when running on the host 130, may interact with the electronic circuitry 140 on the security adapter 100 for allowing controlled user and data communication between the electronic device 120 and the host 130. Such controlled user and data communication typically involve the access control application 142 controlling (e.g., restricting, conditioning, monitoring) login operations, data storage (e.g., read and write) operations and data access and data transfer in and out of the host 130 directly, among other user and data operations that are commenced between the host 130 and the electronic device 120.

The access control application 142 may establish a respective set of rules that are determined based on the electronic circuitry 140 identifying the security adapter 100 to the host 130. Such rules may refer, for example, to the number and type of hosts (e.g., PC) the electronic device 120 can communicate with, authorized times for communication, which operations are allowed (e.g., read file, write file, edit file, etc.) and to which type of data (e.g., secured, protected, read-only), location of the data in the memory (residing on public partition, secured partition), information transfer rate, among other parameters. Accordingly, the way in which the access control application 142 analyzes the data and operates to control user and data operations between the electronic device 120 and the host 130 may depend on the specific system requirements and, optionally, on the various applications running on the host 130.

In one example, the access control application 142 may comprise computer readable program code that, when running on host 130, may interact with the electronic circuitry 140 on the security adapter 100 for receiving data and commands coming in from the connectable electronic device 120. The access control application 142 may then operate to analyze the type of data and/or command and required operation coming in from the electronic device 120, via the security adapter 100. Once an operation, say a data access operation, is analyzed with respect to data residing on the host 130, the required operation may be handled by the access control application 142 accordingly.

The access control application 142 may carry out a variety of response mechanisms for controlling user and data operations between the electronic device 120 and the host 130. This may include denying access of the electronic device 120 to the host 130; restricting the electronic device 120 access to certain types of data and/or data locations on the host 130, for example for reading or writing only certain types of files; or allowing the electronic device 120 access to data residing on the host 130, or to certain portions thereof. Such, for example, to deny the electronic device 120 access to secure data (e.g., legal documents, human resource documents) residing on the host 130. In another example, the access control application 142 may be designed to block any writes of executable files (e.g., files having a .exe extension) to the host 130, or in general to block write of any data to the host 130. As additional illustrative, non-limiting examples, controlling user and data operations between the electronic device 120 and the host 130 may include restricting use of the security adapter 100 to one or more host devices (e.g., computers) or geographic areas (e.g., rooms, such as a conference room) associated with a host network system, restricting use of the security adapter 100 to particular days (e.g., weekdays), restricting use of the security adapter 100 to particular times (e.g., working hours, such as 9 a.m. to 5 p.m.); restricting communication via the security adapter 100 to only permit reading data from the host device 130 (e.g., to avoid a virus being loaded to the host device 130 from the electronic device 120), or restricting communication via the security adapter 100 to only permit writing data to the host device 130 (e.g., to avoid the electronic device 120 from receiving data from the host device 130).

Either way, once the security adapter 100 (with the electronic device 120) is engaged with the host 130 and communication between the electronic device 120 and the access control application 142 running on the host 130 is established, via the security adapter 100, the access control application 142 may operate to control user and data operations between the electronic device 120 and the host 130 for securing access between the electronic device 120 and the host 130.

Such controlled user and data operations may involve aggregating and reporting on user access rights, performing access rights reviews, identifying dormant users and excessive access rights, and so on. For example, identifying unused access rights is fundamental to reducing the risk of unwarranted insider data access. Organizations can identify these states by correlating user access rights with actual data access activity by the electronic device 120. The access control application 142 may monitor and/or "log" the activity in real-time and send alerts to security personnel. For example, with the hosting computer being connected to a network of an organization the set of rules may affect the way in which data in and out of the host are transferred, stored and protected, what happens when that electronic device 120 (for example in the form of a USB drive) leaves the Enterprise, among other operations providing controlled user and data management capabilities to and from the host directly. These and other operations may reduce unwarranted data access by ensuring user rights align with corporate policy. This prevents insiders such as employees, contractors, outsourcers, etc., from accessing data unless there is a business need-to-know.

Access control application 142 may reside on the host 130, or be configured, for example as an executable file, that is downloaded from a server over a network to run on the host 130. Moreover, the access control application 142 may be configured to run on the host 130 without installing or copying components of the access control application 142 into local storage components on the host 130. This increases the portability of use of the access control application 142 with several, differently owned host computers. For similar reasons, the access control application 142 preferably does not involve components requiring reboot of a host computer and/or modification of any sort on a host computer. Nevertheless, this is not meant to limit the scope of this disclosure, so that the access control application 142 may be optionally copied (loaded) onto the internal memory of a host (e.g., the host 130) for actually residing on the host 130, for example on a non-volatile memory component of the host 130.

The above-described access control application 142, including its program code and application files may be (either regularly or dynamically) updated to address changing system requirements and to meet progressing system configurations in any of the means known or yet to be known in the art. For example, with the host 130 connected to a network of an organization, the access control application 142 may be updated with application files and security updates deployed on a server by employing a server update technology that is identical or similar to the Windows® (trademark of Microsoft Corporation, Redwood, Wash.) Server Update Services (WSUS) or Software Update Services (SUS) which are products of Microsoft Corporation of Redwood, Wash. (e.g., Microsoft® is a registered trademark of Microsoft Corporation, Redwood, Wash.). Briefly, WSUS is a computer program developed by Microsoft Corporation that enables administrators to manage the distribution of updates and hotfixes (cumulative package that includes one or more files that are used to address a problem in a software program) to computers on a network in a corporate environment.

It should be noted that operation of the security adapter 100, when engaged with an electronic device 120 and mounted into (e.g., coupled to) the host 130 as described above, requires no change on the host 130 to which the security adapter 100 is connected. Moreover, the way in which the access control application 142 operates and further interacts with the security adapter 100, as described above, may depend on the various applications running on the host 130 and, optionally, on the specific implementation design of the access control application 142.

As already mentioned above, the access control application 142 may reside in the host 130 and executed directly from the host 130, or may be an executable file that is loaded onto the host 130 by using a suitable communications interface, such as via the hosting network. Accordingly, communication between the host 130 and the security adapter 100, and more specifically between the access control application 142 running on the host 130 and the electronic circuitry 140 in the security adapter 100, may be initiated, for example, upon mounting of the security adapter 100 with the electronic device 120 into a port in the host 130.

Figure 2:
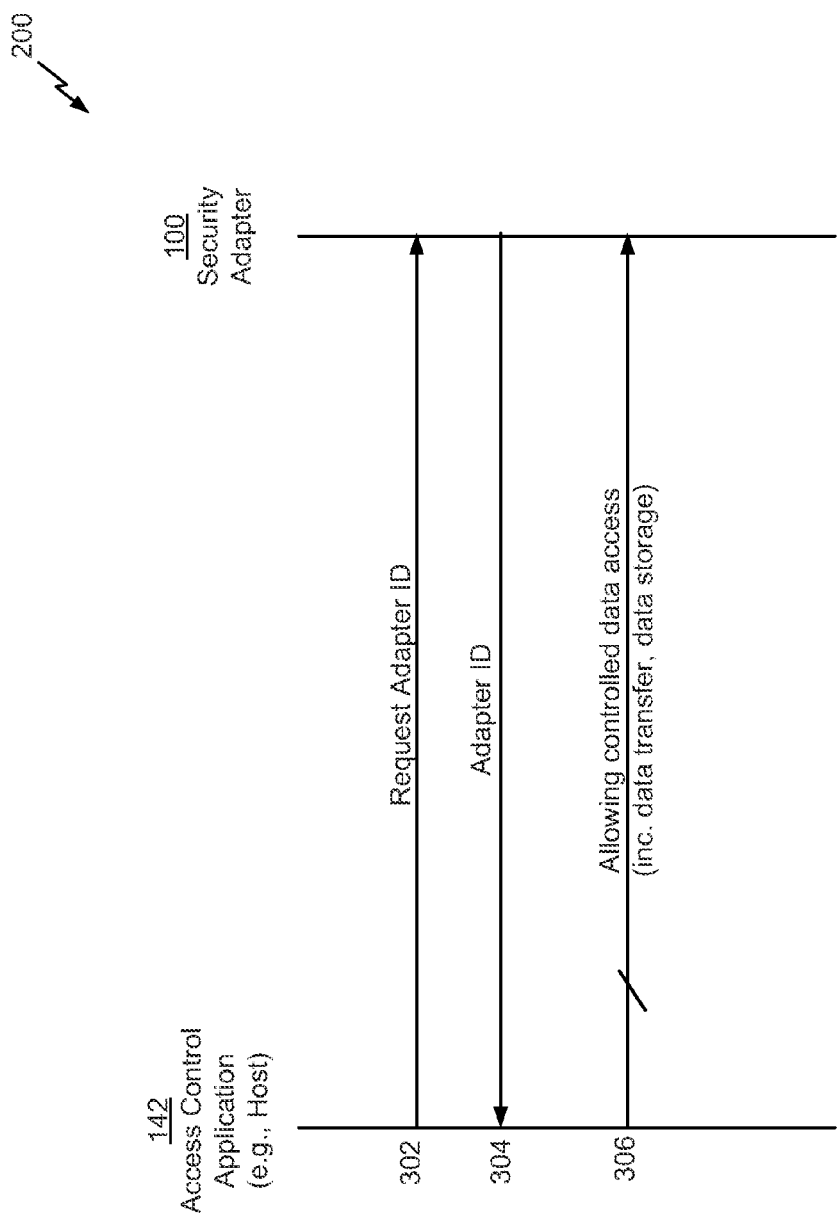
FIG. 2 illustrates a command flow between the security adapter and a connectable host.

FIG. 2 illustrates a command exchange 200 between the access control application 142 on the host 130 and the security adapter 100, according to one embodiment. FIG. 2 will be described in conjunction with FIG. 1B, where the security adapter 100 is configured with two connectors that include a male connector and a female connector, one on each side of the body 102. The male connector, i.e., the plug connector 104, may be configured for engaging with the host 130 and the female connector, i.e., the socket connector 106, may be configured for engaging with the electronic device 120. A particular implementation of FIGS. 3A-C includes the access control application 142 running on the host 130 for securing access to facility and computer systems of an organization.

A user inserts the security adapter 100 (with the electronic device 120) into the host connector 132 of the host 130 to begin use of the electronic device 120. The insertion of the security adapter 100 into the host 130 prompts drivers or components of the host operating system to establish communication between the security adapter 100 and the access control application 142 running on the host 130.

In an embodiment, communication between the access control application 142 and the security adapter 100 (and the electronic device 120) involves an authentication session for verifying the authenticity of the electronic device's 120 resident applications and stored content to ensure that the host 130, and, optionally, other computer systems of the associated Enterprise hosting network, are eligible to receive (e.g., protected) data that are stored on the electronic device 120, via the security adapter 100. For example, this may be applicable for preventing a malicious application residing on the electronic device 120 (e.g., on the USB drive) from copying, or even uploading itself onto the connectable host, such as the host 130, so that to ensure the organization's information systems remain secure.

Optionally, communication between the host 130 and the security adapter 100 may be performed over a secure channel. The secure channel may be established, for example, by the access control application 142 employing a key-exchange mechanism that is identical or similar to the key-exchange mechanism employed by Institute of Electrical and Electronics Engineers (IEEE) 1667 Authentication Silo. Briefly, IEEE 1667 ("Standard Protocol for Authentication in Host Attachments of Transient Storage Devices") is a standard that describes a method(s) or a process(es) for authenticating storage devices, such as USB flash drives, when the storage devices are interfaced with a computer.

Either way, once a communication channel is established between the security adapter 100 and the access control application 142 on the host 130, the access control application 142 triggers an "identification process", in which the security adapter 100 is identified in front of the access control application 142 running on the host 130. More specifically, mounting the security adapter 100 into the host 130 invokes the access control application 142 running on the host 130 to issue a request, at 302, for receiving the security adapter identification number (ID), such as the identifier 1144 of FIG. 1A. This prompts the electronic circuitry 140 of the security adapter 100 to transmit, at 304, the security adapter ID to the access control application 142 for identifying the security adapter 100 to the host 130. The security adapter ID may be in the form of a unique serial number that respectively identifies the security adapter in front of the host 130.

Following this, the access control application 142 operates to allow controlled user access operations and data access operations between the host 130 and the electronic device 120, via the security adapter 100. Such controlled user access operations and data access operations involve controlled data transfer and data storage (read, write) operations, shown at 306. In an example, if a command coming in from the electronic device 120 includes a request to conduct an operation that is not allowed, the access control application 142 may deny performing the operation and may issue an alert signal to the security personnel of the Enterprise.

The controlled data access performed by the access control application, per the command transfer shown at 306, may be repeated multiple times, for example, each time for allowing controlled user access and data access to and from a different data location on the host 130 and/or the electronic device 120. With the access control application 142 determining that a UFD and/or data access command is not authorized to perform the associated operation (such as to access a requested data location) on the host 130, the access control application 142 may indicate the host 130 and/or the user accordingly.

It should be noted that the command flow described herein above with respect to FIG. 2 is an example only that is not meant to limit the scope of this disclosure, so that various modifications, variations, alterations, situations, and equivalents can be apparent and any activity can be repeated and any activity can be performed by multiple entities. For example, the authentication process is an optional process that may be initiated by the access control application 142 host 130 and typically meant to provide a higher level of assurance in communication between the host 130 and the electronic device 120. Such authentication can also be performed as (an integral) part of the "identification process" (at 302), e.g., upon insertion of the security adapter 100 into a port in the host 130. Moreover, the way in which the access control application 142 running on the host 130 operates and further interacts with the electronic circuitry 140 when connected to the security adapter 100 may depend on the specific implementation design of the access control application 142 and, optionally, on the various applications running on the host 130.

As can be, such command flow provides for the access control application 142, when running on the host 130, to interact with the electronic device 120, via the security adapter 100, for controlling user access and data access, thereby for securing user access and data access to the host 130, in particular, and to the facility of and other networked computer systems within an organization associated with the host 130, in general.

Figure 3A:
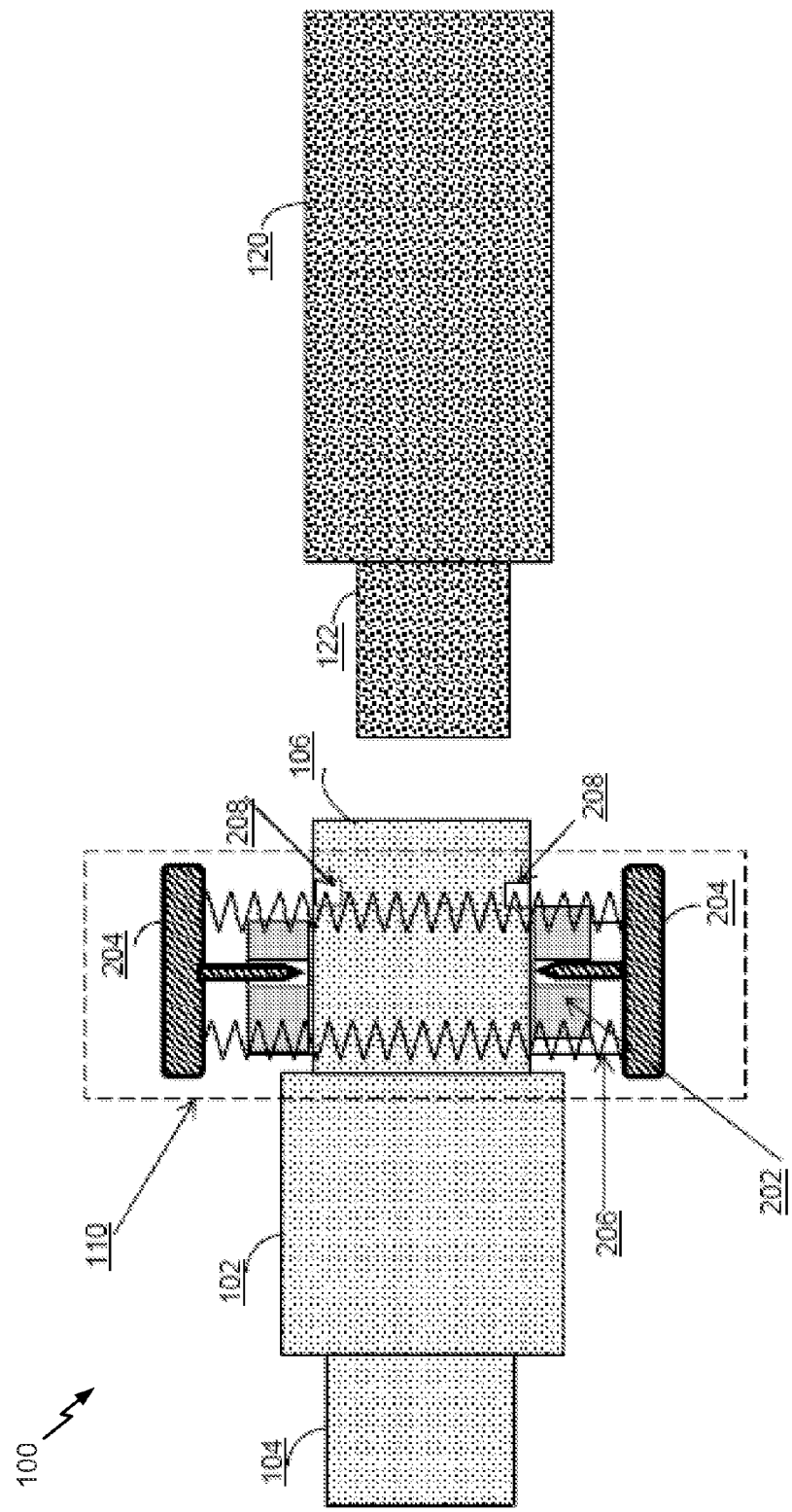
FIG. 3A is a first diagram of a first illustrative example of the security adapter of FIG. 1B.

FIG. 3A is a cross-sectional view of the security adapter 100 for engaging with an electronic device, according to an embodiment. FIG. 3A will be described in conjunction with FIG. 1B, where the security adapter 100 is associated with the socket connector 106 and configured with the interlocking structure 110 for locking the socket connector 106 to a connectable electronic device, such as the electronic device 120, typically in the form of a USB flash drive or other mass storage means.

As already mentioned above, the interlocking structure 110 is configured to have first and second positions, so that in the first position (shown as "A" in FIG. 3B) the interlocking structure 110 locks an unlocked engagement of the electronic device 120 to the socket connector 106 to which it is engaged with. In the second position (shown as "B" in FIG. 3C) the interlocking structure 110 unlocks a locked engagement of the electronic device 120 from the socket connector 106, thereby allowing removal of the electronic device 120 from the security adapter 100.

In an embodiment, interlocking structure 110 includes a slidable element 202 with latches 204 and an elastic member, such as in form of springs 206 pushing elements 204 inwards. The slidable element 202 can be designed in any shape suitable to allow latches and to allow bringing the interlocking structure 110 to the first position (shown as "A" in FIG. 3B) and second position (shown as "B" in FIG. 3C) upon the socket connector 106. In an embodiment, the slidable element 202 is a lever, button or dial coupled to the socket connector 106, for example on each sides of the socket connector 106.

In a typically implementation, the latches 204 are provided for mechanically locking the slidable element 202 in a fixed positioning (i.e., in the first position, shown as "A" in FIG. 3B) upon the socket connector 106. For achieving this, the latches 204 are designed in a way that fit into corresponding latch receptacles 208 in the interlocking structure 110. Per FIG. 3A, the latches 204 in the interlocking structure 110 are designed on either sides of the socket connector 106. As such, when the socket connector 106 is fully connected to the device connector 122 (shown as "A" in FIG. 3B), the latches 204 lock the device connector 106 from either sides of the device connector 106 by penetrating into the socket connector 106 through latch receptacles 208.

The springs 206 are typically attached to the latches 204; namely, to the internal surfaces of the latches 204 that face the socket connector 106 in a manner that connects between the latches 204 on each side of the socket connector 106. The springs 206 may be flexed out in the direction external to the socket connector 106 to enable widening the gap between the latches 204 and extracting the latches 204 from their positioning within latch receptacles 208. With the springs 206 flexing outwardly as indicated by arrows 494, the interlocking structure 110 is free to move about socket connector 106.

FIG. 3B is a cross-sectional view of the security adapter 100 with the interlocking structure 110 being in a locked position and engaged with an electrical device, according to one embodiment. FIG. 3B will be described in conjunction with FIG. 3A. In the locked position, shown as "A" in FIG. 3B, the latches 204 are positioned within the latches receptacles 208 to mechanically constrain removal of the device connector 122 from the socket connector 106. The positioning of the latches 204 within the latch receptacles 208 may prevent movement of the springs 206 upon the interlocking structure 110 without using an external tool. That is, positioning of the latches 204 within the latch receptacles 208 prevent the springs 206 from flexing outwardly, such that the springs 206 are flexed inwardly in the direction indicated by arrows 402. Accordingly, the socket connector 106 mounted to the electronic device 120 is secured under a modest resistance. As long as the interlocking structure 110 remains in a locked position, the security adapter 100 is engaged to the electronic device 120 and cannot be removed by an unauthorized user.

FIG. 3C is a cross-sectional view of the security adapter 100 with the interlocking structure 110 being in an unlocked position and engaged with an electrical device, according to one embodiment. FIG. 3C will be described in conjunction with FIG. 3A. In the unlocked position, shown as "B" in FIG. 3C, the latches 204 extend outward and away from the latch receptacles 208 with which they are aligned, so that the springs 206 are free to flex outwardly in the direction indicated by arrows 494. Accordingly, the gap between the latches 204 on each side of the socket connector 106 is sufficient for the springs 206 to flex outwardly, such that the latches 204 are pushed out of the latch receptacles 208. As shown in FIG. 3C, the latches 204 are pushed out far enough in order to allow the interlocking structure to move about the socket connector 106; namely, from position "A" to position "B".

It should be noted that the interlocking structure 110 including the slidable element 202 is not necessarily so restricted in its configuration with the latches 204 and springs 206, in that, e.g., the slidable element with latches must be designed on each side of the socket connector 106, or if the slidable element are designed on each side of the socket connector that these sides are opposite each other, that the springs are parallel to each other, located in any other configuration relative to each other, or that any of the elements are restricted in any other way. Such, for example, the interlocking structure 110 may be held in a locked position in various ways, such as friction or designing the interlocking structure 110 with the slidable element 202 to move slightly beyond the first position (relative to pushback force of the springs 206 against latches in the interlocking structure 110) before the latches are brought to a fixed positioning upon the socket connector 106. When in the locked position, the electronic device 120 may be prevented from being removed from the interlocking structure 110 (e.g., a securing structure). In the locked position, the interlocking structure 110 may enable communication, such as one or more requests for read access or write access to the electronic device 120, to be constrained (e.g., restricted) to occur via the security adapter 100. To illustrate, the securing structure in the locked configuration may restrict data transfer between the electronic device and another device to occur via the security adapter. When the interlocking structure 110 is in the locked position, a securing space 498 that includes the electronic device 120, the security adapter 100, or a combination thereof, may be established. The securing space 498 may correspond to a volume, such as a three dimensional space, in which the electronic device 120, the security adapter 100, or a combination thereof, in included.

The electronic device 120, the security adapter 100, or a combination thereof, may be at least partially located within the securing space associated with the securing structure.

Returning to FIG. 3A, the security adapter 100 with socket connector 106 and interlocking structure 110 is capable of engaging with the electronic device 120 in such a way that the interlocking structure 110 locks an unlocked engagement of the interlocking structure 110 to the socket connector 106 to which it is engaged with for locking the electronic device 120 to such connector.

In an embodiment, the interlocking structure 110 is operable in the first position (shown as "A" in FIG. 3B) upon mounting the security adapter 100 to an electronic device, such that the socket connector 106 is engaged with a device connector of the electronic device. In a typical implementation, the interlocking structure 110 is operable to transition from the first position (shown as "A") to the second position (shown as "B" in FIG. 3C) contingent on (e.g., via) external means. In such case, removal of the security adapter 100 from the electronic device 120 may be achieved by utilizing special means or mechanism, such as in the form of a special tool applying a mechanical force that allow for extracting the latches 204 from within their positioning in latch receptacles 208.

In one example, the special tool, when utilized with the security adapter 100, applies mechanical forces, such as in the form of a magnetic force, on the interlocking structure 110. More specifically, the magnetic force is applied on the latches 204 when the socket connector 106 is engaged with the electronic device 120 and the latches 204 are fixed within the corresponding latch receptacles 208 in the socket connector 106. As a result of the magnetic force applied on the latches 204, the latches 204 are extracted from their positioning within latch receptacles 208. This allows for the slidable element 202 in the interlocking structure 110 to move about the socket connector 106, thereby bringing the interlocking structure 110 to its second position (shown as the second position "B" in FIG. 3C) to unlock the locked engagement of the electronic device 120 to the socket connector 106.

In another example, the special means may be a mechanical or an electric lock that requires an authorized password, or other sort of secure information that the user using the security adapter with his/her electronic device does not possess. Again, this tool may be operable contingent on an authorized password to allow for the interlocking structure 110 to transition from the first position (shown as "A") to the second position (shown as "B" in FIG. 3C) upon the socket connector 106.

Moreover, the interlocking structure 110 is operable to transition from the first position (shown as "A") to the second position (shown as "B" in FIG. 3C) contingent on external means, which means are typically of, or associated with an authorized entity for unlocking a locked engagement of the interlocking structure 110 to the socket connector 106 in the security adapter 100. For example, with the security adapter 100 provided for securing access to facility and computer systems of an organization, the removal process may be performed by an authorized user, such as an Information Technology (IT) person (e.g., a network administrator) or security officer in the organization. The authorized user may utilize the special tool with the security adapter 100 for removing the security adapter 100 from the electronic device 120 when the socket connector 106 is engaged with the electronic device 120.

The above-disclosed configuration allows bringing the interlocking structure 110 in the security adapter 100 to a locked position upon the socket connector 106 for locking the electronic device 120 to the socket connector 106 when the socket connector 106 is engaged with the electronic device 120, but also provides for releasing the interlocking structure 110 from its locked state upon the socket connector 106 to thereby enable removal of the socket connector 106 from the electronic device 120. It is appreciated that typically as long as the interlocking structure remains in its locked position upon the socket connector 106, the slidable element 202 with the latches 204 and springs 206 function to effectively constrain movement of the interlocking structure 110 about the socket connector 106; that is to an unlocked position, and not to allow disengaging of the security adapter 100 from a connectable electronic device without the use of a special tool.

It is also appreciated that the security adapter exemplified herein with reference to security adapter 100 can have any shape, size, configuration, orientation, etc., and can consist of any kind of slidable element, latching means, interlocking structure, electronic circuitry, etc. It is further appreciated that embodiments of this disclosure may be practiced with functionality, exemplified herein with reference to interlocking structure 110, slidable element 202, latches 204, and springs 206, wherein the listed elements are positioned, configured, oriented, etc., in such a way that the location of all or any of these elements is not limited in any way and provided herein as an example only.

Referring to FIGS. 4A-B, views of an illustrative embodiment of a securing structure 404 are depicted. FIG. 4A depicts a first view 400 of the securing structure 404 and FIG. 4B depicts a second view 430 of the securing structure 404. Additionally, FIG. 4C depicts a third view 470 of an illustrative embodiment of the securing structure 404 of FIGS. 4A-B that includes a locking device. For example, the securing structure 404 may correspond to the securing structure 1198 of FIG. 1A.

The securing structure 404 may be configurable to have a locked configuration. When the securing structure 404 is in the locked configuration, physical access to an electronic device, such as the electronic device 120 of FIG. 1A, to remove the electronic device from the securing structure 404 so that a different electronic device may be coupled to the security adapter 100 is prevented. For example, when the securing structure 404 is in the locked configuration, another electronic device is prohibited from being coupled to the security adapter 100 without first configuring the securing structure 404 in an unlocked configuration (e.g., without destroying, distorting, or damaging the securing structure, the electronic device, or the security adapter, such as breaking or distorting the securing structure or the electronic device to force the securing structure into an unlocked configuration or to forcibly remove the electronic device from the securing structure that is in the locked configuration). When the securing structure 404 is in the locked configuration and when a security adapter 410, such as the security adapter 100 of FIG. 1A, is coupled to the electronic device 120, the security adapter 410 may be enabled to be coupled with the host device 130. The securing structure 404 in the locked configuration may securely couple the electronic device 120 to the security adapter 410. Alternatively, the securing structure 404 in the locked configuration may permit the electronic device 120 to be communicatively decoupled from an interface of the security adapter 410 (e.g., the interface 408), but the security structure 100 in the locked configuration will still not allow another electronic device to be connected to the interface of the security adapter 410.

Referring to FIG. 4A, the first view 400 includes the security adapter 410, the electronic device 120, and the securing structure 404. For example, the security adapter 410 may include the security adapter 100 of FIG. 1A. The first view 400 depicts the securing structure 404 in an unsecured configuration, such as an unlocked configuration.

The security adapter 410 may include one or more interfaces, such as a first interface 407 and a second interface 408. The first interface 407 and the second interface 408 may correspond to the host device interface 1104 and the electronic device interface 1106, respectively, of FIG. 1A. The first interface 407 may be configured to enable the security adapter 410 to be engaged with one or more host devices, such as the host device 130 of FIG. 1A. The second interface 408 may be configured to enable the security adapter 410 to be engaged with one or more electronic devices, such as the electronic device 120. As an illustrative example, the second interface 408 may include a USB connector to enable communication with the electronic device 120 via a USB connector of the electronic device 120.

The securing structure 404 may include a container 406 and a cover 426, such as a lid for the container 406. The cover 426 may be configured to be coupled to the container 406. For example, the container 406 may be coupled to the cover 426 via a hinge 424. Alternatively, the cover 426 may be configured to be coupled to the container 406 without use of the hinge 424, as descried with reference to FIGS. 5A-B and 6A-B. The container 406 and the cover 426 may each include a conduit (e.g., a channel or a hole) to enable the securing structure 404 to be configured in the locked configuration, as described further with reference to FIG. 4B. For example, the container 406 may include a first conduit 416 and the cover 426 may include a second conduit 414.

The container 406 may include an open end 422 and an opening 412. The open end 422 may be configured to receive the security adapter 410, the electronic device 120, or a combination thereof. For example, the security adapter 410, the electronic device 120, or a combination thereof, may be inserted into a cavity 428 of the container 406 when the cover 426 is decoupled from the container 406. The size of the cavity 428 and the width of the wall of opening 412 may be configured to dimensionally enable an interface, such as the interface 407 of the security adapter 410 or an interface of the electronic device 120, to be coupled to a host device when the security adapter 410, the electronic device 120, or a combination thereof, are located within the cavity 428 of the securing structure 404.

Referring to FIG. 4B, the second view 430 depicts the securing structure 404 in the locked configuration. In the locked configuration, the cover 426 may be coupled to the container 406. A locking device 450, such as an external means, may be applied (e.g., used) to the securing structure 404 to configure the securing structure 404 in the locked configuration. For example, the locking device 450 may be inserted through the first conduit 416 and through the second conduit 414. The locking device 450 may include a lock, a security tag, or a zip tie, as illustrative, non-limiting examples. Alternatively or additionally, the locking device 450 may include a mechanical or electronic locking means, as described with reference to FIG. 4C. When the securing structure 404 is in the locked configuration, a securing space 440, such as an enclosed space, may be established by the securing structure 404. For example, the securing space 440 may correspond to a volume, such as the cavity 428, in which the security adapter 410, the electronic device 120, or a combination thereof, are contained while the securing structure 404 is configured in the locked configuration. The electronic device 120, the security adapter 100, or a combination thereof, may be at least partially located within the securing space 440 associated with the securing structure 404.

The securing structure 404 may be configured in the locked configuration when the security adapter 410, the electronic device 120, or a combination thereof, are located within the cavity 428, such as the securing space 440 established by the securing structure 404 in the locked configuration. When the securing structure 404 is in the locked configuration and when the security adapter 410 is coupled to the electronic device 120, the security adapter 410 may be enabled to be coupled with one or more host devices, such as the host device 130 of FIG. 1A, via the opening 412. The security adapter 410 and the electronic device 120 can be firmly held within the securing space 440 using friction with the indoor walls of the securing space 440, or using an adjustable spacer between the device 120 and the cover 426, to ensure that, when an attempt is made to physically couple the security adapter 410 to the host device 130, the security adapter 410 and the electronic device 120 are not permitted to slide back within the securing space 440.

When the securing structure 404 is in the locked configuration and when the security adapter 410, the electronic device 120, or a combination thereof, is positioned within the securing space 440, the securing structure 404 may prohibit one or more of the security adapter 410 or the electronic device 120 from being removed from the securing space 440. As an illustrative example, when the securing structure 404 is in the locked configuration and when the security adapter 410 and the electronic device 120 are positioned within the securing space 440, the securing structure 404 may prevent the electronic device 120 from being removed from the security adapter 410. As another illustrative example, when the securing structure 404 is in the locked configuration and when the electronic device 120 is located within the securing space 440, physical access to the electronic device 120 to remove the electronic device 120 from the security adapter 410 is prevented by the securing structure 404. For example, when the securing structure 404 is in the locked configuration, the electronic device 120 cannot be "swapped" (e.g., replaced) with a different electronic device.

Referring to FIG. 4C, the third view 470 of the securing structure 404 is depicted that includes a locking device 490 coupled to the container 406. The locking device 490 may be configured to couple the cover 426 to the container 406. For example, the locking device 490 may include a mechanical device, an electrical device, or a combination thereof, configured to secure the cover 426 to the container 406. As an illustrative example, when the locking device 490 is the mechanical device, the locking device 490 may require a password (cipher) or key to decouple the cover 426 from the container 406. As another illustrative example, when the locking device 490 is the electrical device, the locking device 490 may require an input, such as an input from a biometric scanner or a password input via a keypad to decouple the cover 426 from the container. For example, the locking device 490 may include the biometric scanner.

Figure 5A:
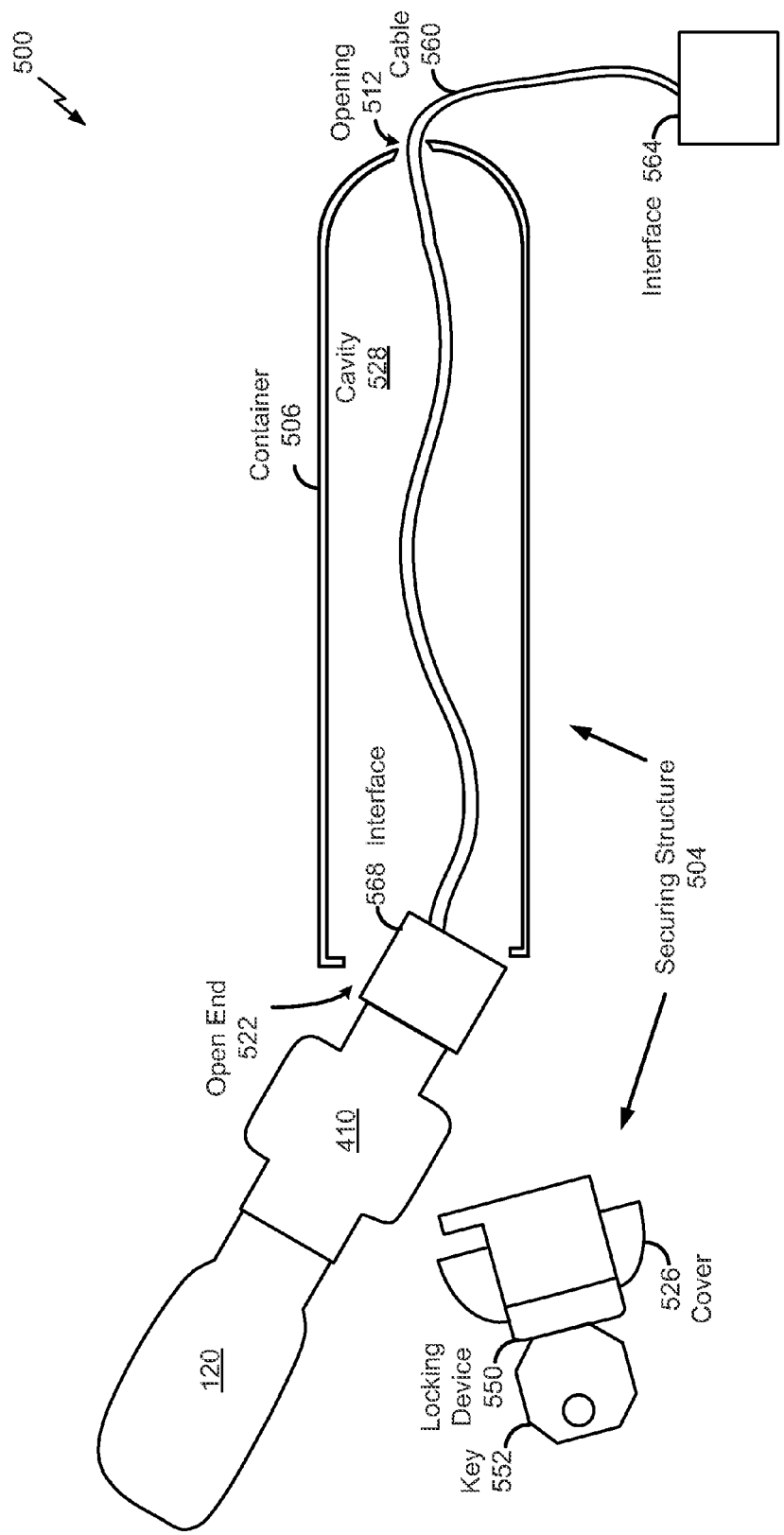
FIGS. 5A-B are views of an illustrative embodiment of a securing structure.
Figure 5B:
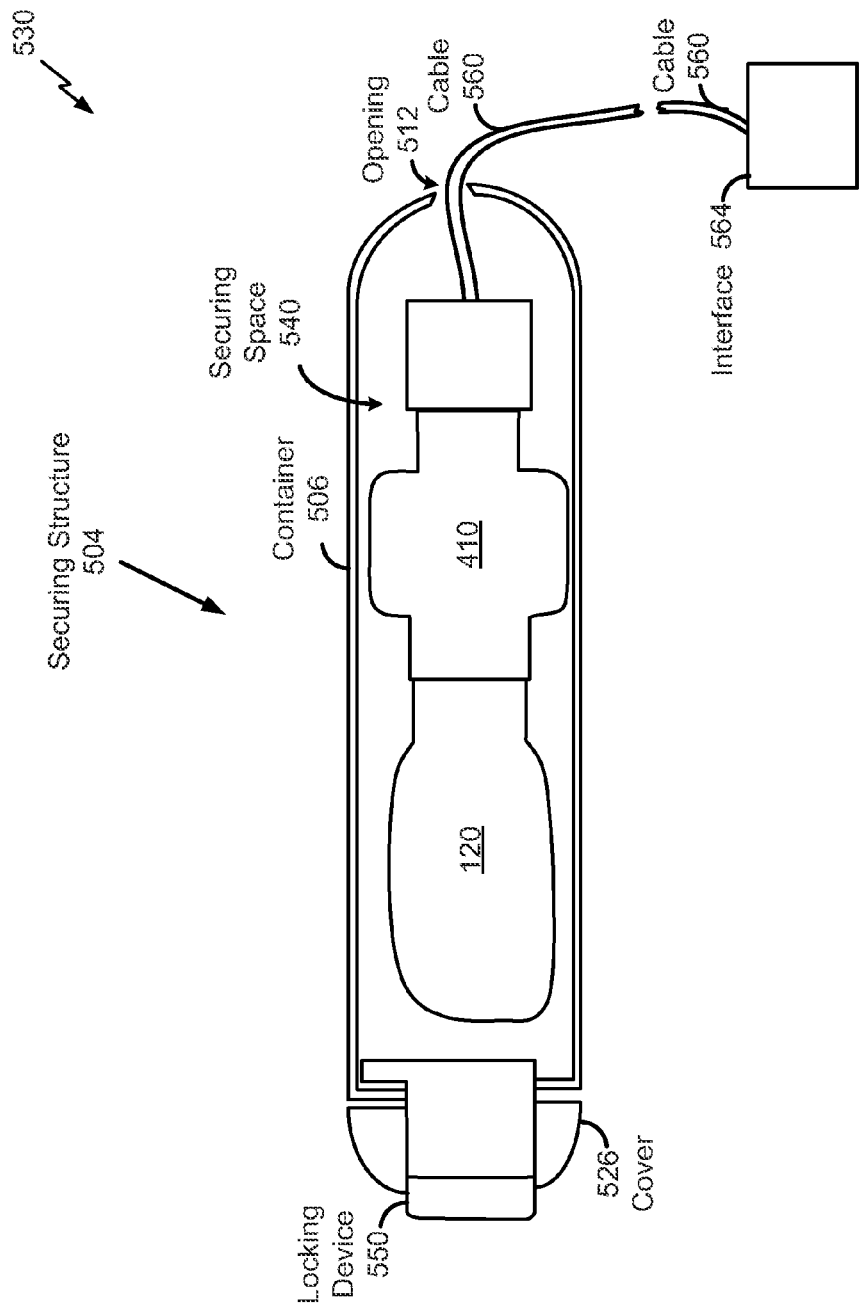

Referring to FIGS. 5A-B, views of an illustrative embodiment of a securing structure 504 are depicted. FIG. 5A depicts a first view 500 of the securing structure 504 in an unsecured configuration (e.g., an unlocked configuration) and FIG. 5B depicts a second view 530 of the securing structure 504 in a secured configuration (e.g., a locked configuration). For example, the securing structure 504 may correspond to the securing structure 1198 of FIG. 1A.

Referring to FIG. 5A, the first view 500 includes the security adapter 410, the electronic device 120, and the securing structure 504. As depicted in the first view 500, the securing structure 504 is in an unsecured configuration, such as an unlocked configuration.

The securing structure 504 may include a container 506 and a cover 526, such as a cap for the container 506. The cover 526 may be configured to be coupled with the container 506. The container 506 and the cover 526 may correspond to the container 406 and the cover 426, respectively, of FIGS. 4A-C.

The container 506 may include an open end 522 and an opening 512. The open end 522 may be configured to receive the security adapter 410, the electronic device 120, or a combination thereof. For example, the security adapter 410, the electronic device 120, or a combination thereof, may be inserted into a cavity 528 of the container 506 when the cover 526 is decoupled from the container 506, such as when the securing structure 504 is in the unsecured configuration.

The opening 512 may be configured to enable an interface, such as the interface 407 of the security adapter 410 or an interface of the electronic device 120, to be coupled to a host device when the security adapter 410, the electronic device 120, or a combination thereof, are located within the cavity 528 of the securing structure 504. For example, a cable 560 may extend through the opening 512. The cable 560 may have connectors (e.g., interfaces), such as a first connector 564 and a second connector 568. The first connector 564 may be configured to be coupled to the host device and the second connector 568 may be configured to be coupled to an interface of the security adapter 410 and/or to an interface of the electronic device 120. As an illustrative example, the cable 560 may be combined (e.g., integrated) with the security adapter 410, such that the first connector 564 is the interface 407 of the security adapter 410, as described in further detail with reference to FIGS. 6A-B. The container 506 can be made large enough to accommodate any size of electronic device, such as the electronic device 120. As compared to the securing structure 404 of FIG. 4 (e.g., where the security adapter 410 and the electronic device 120 had to be supported within the container 406 to avoid the security adapter 410 sliding back when the security adapter 410 is plugged into an interface of a host device 130), the securing structure 504 of FIGS. 5A-B may permit the security adapter 410 and/or the electronic device 120 to move freely (e.g., may be unsupported) within the container 506, as a force in interfacing into the host device 130 is applied to the plug 504 and is not applied to the container 506.

The cover 526 may include a locking device 550, such as a lock, incorporated into the cover 526. For example, the locking device 550 may correspond to the locking device 450 of FIG. 4B or the locking device 490 of FIG. 4C. The locking device 550 may be used for configuring the securing structure 504 in the locked configuration. The locking device 450 may be operated using a key 552. The cover 526 may be configured to be coupled to the container 506. For example, the cover 526 may be coupled to the container 506 using the locking device 550.

Referring to FIG. 5B, the second view 530 depicts the securing structure 504 in a secured configuration, such as a locked configuration. In the locked configuration, the cover 526 may be coupled to the container 506 (the cover 526 may be fastened to the container 506). The locking device 550 may be used for configuring the securing structure 504 in the locked configuration with the key 552 removed. When the securing structure 504 is in the locked configuration, a securing space 540, such as an enclosed space, may be established by the securing structure 504. For example, the securing space 540 may correspond to a volume, such as the cavity 528, in which the security adapter 410, the electronic device 120, or a combination thereof, are contained while the securing structure 504 is configured in the locked configuration.

Figure 6A:
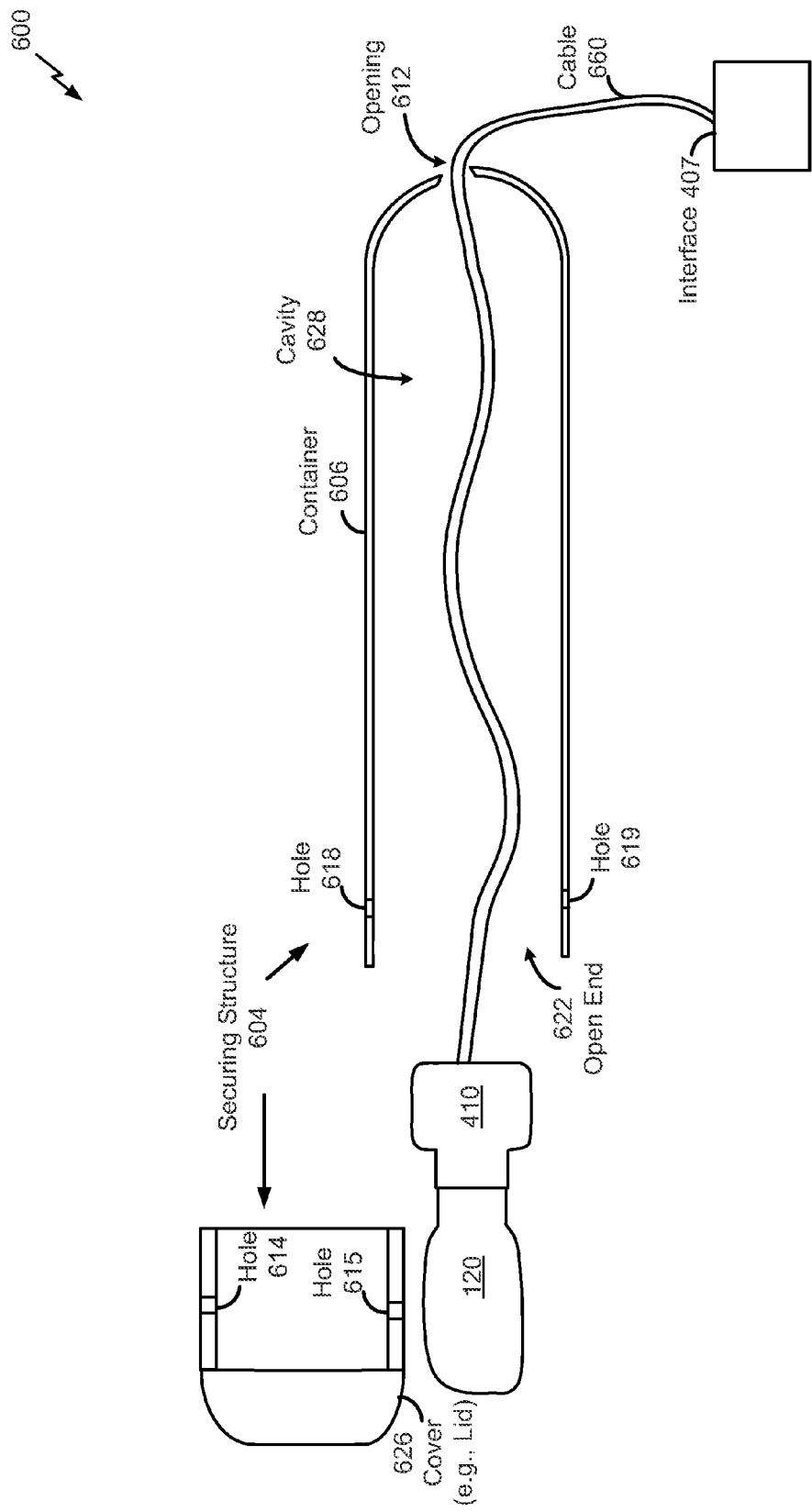
FIGS. 6A-B are views of an illustrative embodiment of a securing structure.
Figure 6B:
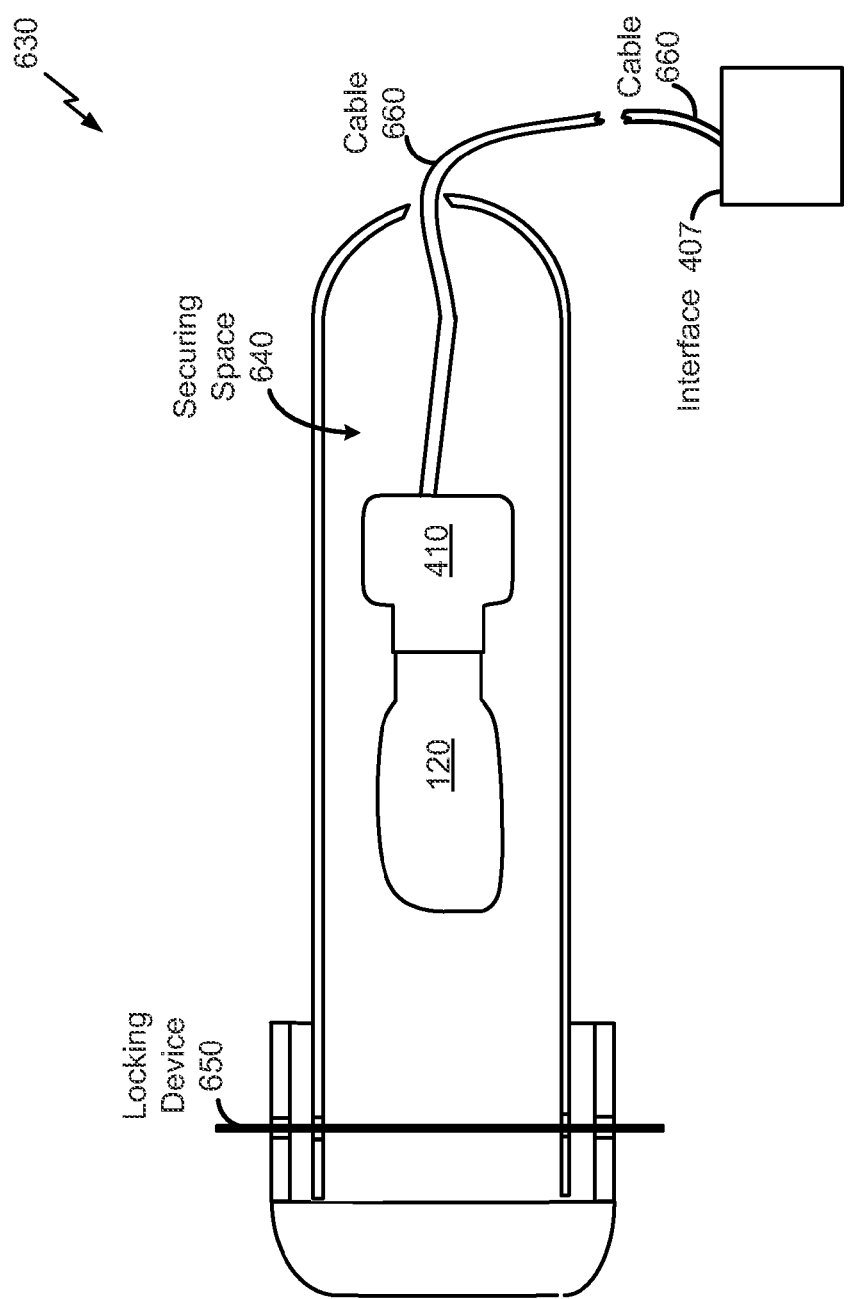

Referring to FIGS. 6A-B, views of an illustrative embodiment of a securing structure 604 are depicted. FIG. 6A depicts a first view 600 of the securing structure 604 in an unsecured configuration (e.g., an unlocked configuration) and FIG. 6B depicts a second view 630 of the securing structure 604 in a secured configuration (e.g., a locked configuration). For example, the securing structure 604 may correspond to the securing structure 1198 of FIG. 1A.

Referring to FIG. 6A, the first view 600 includes the security adapter 410, the electronic device 120, and the securing structure 604. As depicted in the first view 600, the securing structure 604 is in an unsecured configuration, such as an unlocked configuration.

The securing structure 604 may include a container 606 and a cover 626, such as a cap for the container 606. The cover 626 may be configured to be coupled with the container 606. The container 606 and the cover 626 may correspond to the container 406 and the cover 426, respectively, of FIGS. 4A-C, or the container 506 and the cover 526, respectively, of FIGS. 5A-B.

The container 606 may include an open end 622 and an opening 612. The open end 622 may be configured to receive the security adapter 410, the electronic device 120, or a combination thereof. For example, the security adapter 410, the electronic device 120, or a combination thereof, may be inserted into a cavity 628 of the container 606 when the cover 626 is decoupled from the container 606, such as when the securing structure 604 is in the unsecured configuration. The container 606 may include one or more holes, such as a first hole 618 and a second hole 619, that may be configured to receive a locking device 650, as described with reference to FIG. 6B. For example, the locking device 650 may correspond to the locking device 450 of FIG. 4B, the locking device 490 of FIG. 4C, or the locking device 550 of FIGS. 5A-B.

The opening 612 may be configured to have a cable 660 pass through the opening 612. For example, a cable 660 may extend through the opening 612. The cable 660 may be part of the security adapter 410 and coupled to a body of the security adapter 410 at a first end of the cable 660 and may include the interface 407 of the security adapter 410 at a second end of the cable 660.

The cover 626 may include one or more holes, such as a third hole 614 and a fourth hole 615, that may be configured to receive the locking device 650, as described with reference to FIG. 6B. The cover 626 may be configured to be coupled to the container 606. For example, the cover 626 may be coupled to the container 606 using the locking device 650.

Referring to FIG. 6B, the second view 630 depicts the securing structure 604 in a secured configuration, such as a locked configuration. In the locked configuration, the cover 626 may be coupled to the container 606 (the cover 626 may be fastened to the container 606). The locking device 650 may be used for configuring the securing structure 604 in the locked configuration. For example, the locking device 650 may be inserted through one or more of the holes of the container 606, such as the first hole 618 and/or the second hold 619, and one or more of the holes of the cover 626, such as the third hole 614 and/or the fourth hole 615.

When the securing structure 604 is in the locked configuration, a securing space 640, such as an enclosed space, may be established by the securing structure 604. For example, the securing space 640 may correspond to a volume, such as the cavity 628, in which the security adapter 410, the electronic device 120, or a combination thereof, are contained while the securing structure 604 is configured in the locked configuration.

Figure 7:
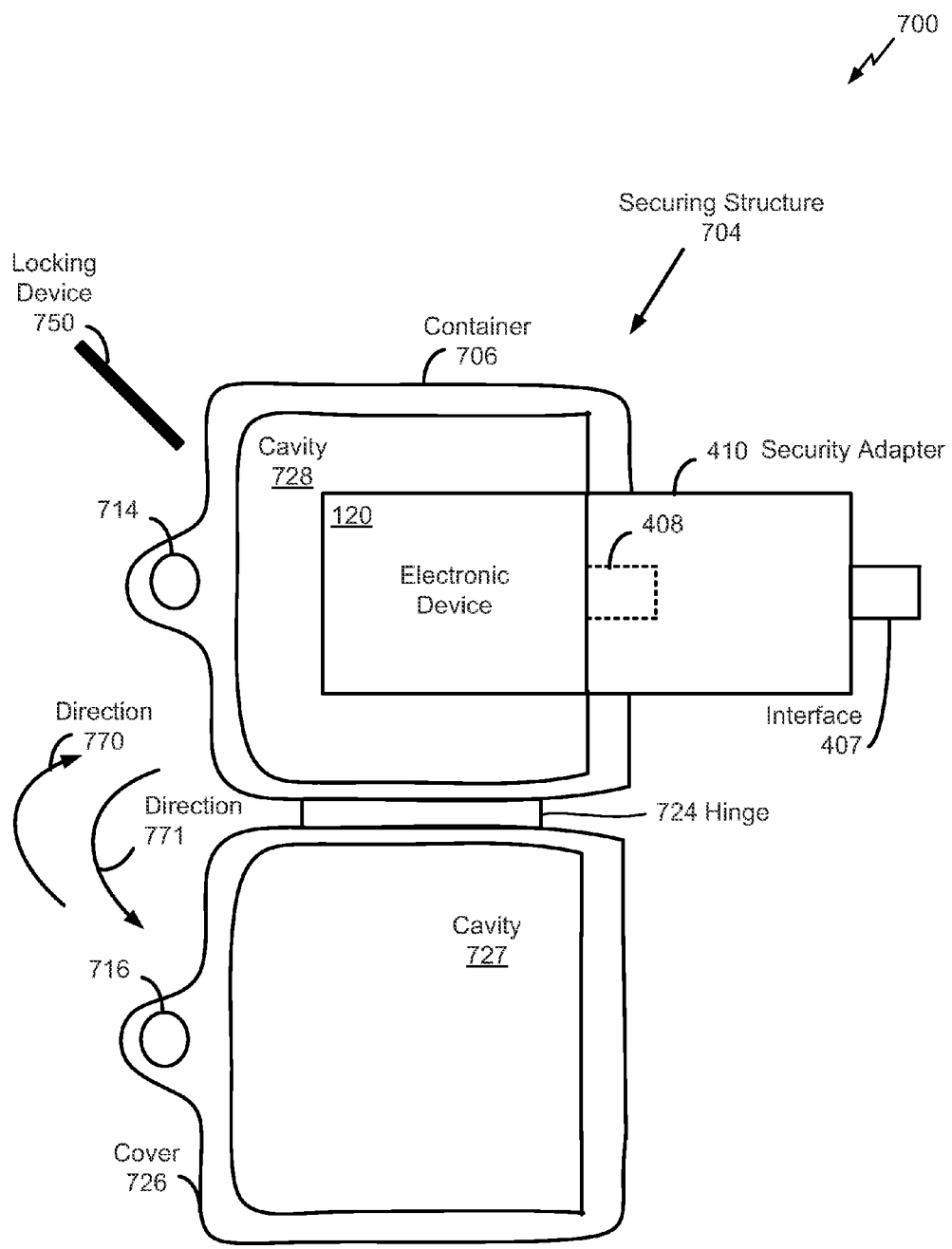
FIG. 7 is a view of an illustrative embodiment of a securing structure.

Referring to FIG. 7, a view of an illustrative embodiment of a securing structure 704 is depicted and generally designated 700. FIG. 7 depicts the view 700 of the securing structure 704 in an unsecured configuration (e.g., an unlocked configuration). For example, the securing structure 704 may correspond to the securing structure 1198 of FIG. 1A.

The securing structure 704 may be coupled to the security adapter 410. For example, a portion of a housing of the security adapter 410 and a portion of the securing structure 704 may be a single physical piece of material, such as a piece of formed (e.g., molded) plastic. The securing structure 704 may include a container 706 and a cover 726, such as a cap for the container 706. The cover 726 may be configured to be coupled with the container 706. For example, the container 706 may be coupled to the cover 726 via a hinge 724. Alternatively, the cover 726 may be configured to be coupled to the container 706 without use of the hinge 724. The container 706 and the cover 726 may correspond to the container 406 and the cover 426, respectively, of FIGS. 4A-C, the container 506 and the cover 526, respectively, of FIGS. 5A-B, or the container 606 and the cover 626, respectively, of FIGS. 6A-B, as illustrative, non-limiting examples.

The container 706 may include a cavity 728. The electronic device 120 may be at least partially inserted into the cavity 728. For example, the electronic device 120 may be inserted into the cavity 728 when the cover 726 is decoupled from the container 706, such as when the securing structure 704 is in the unsecured configuration. The container 706 may include one or more holes, such as a first hole 714, that may be configured to receive a locking device 750, as described further herein. For example, the locking device 750 may correspond to the locking device 450 of FIG. 4B, the locking device 490 of FIG. 4C, the locking device 550 of FIGS. 5A-B, or the locking device 650 of FIG. 6B, as illustrative, non-limiting examples.

The cover 726 may include a cavity 727 and one or more holes, such as a second hole 716, that may be configured to receive the locking device 750, as described further herein. The electronic device 120 may be at least partially inserted into the cavity 727. The cover 726 may be configured to be coupled to the container 706. The cover 726 may be coupled to the container 706, using the locking device 750, to configure the securing structure 704 in a secured configuration, such as a locked configuration. For example, the cover 726 may be rotated about the hinge 724 in a direction 770 to transition the securing structure 704 from the unsecured configuration to the secured configuration. When the securing structure 704 is in the secured configuration (e.g., the locked configuration), the electronic device 120 may be positioned at least partially in the cavity 728, at least partially the cavity 727, or at least partially in the cavity 728 and at least partially in the cavity 727.

The locking device 750 may be used for securing the securing structure 704 in a locked configuration. For example, the locking device 750 may be inserted through one or more holes of the container 706, such as the first hole 714, and through one or more holes of the cover 726, such as the second hole 716. The cover 726 may be rotated about the hinge 724 in a direction 771 to transition the securing structure 704 from a secured configuration to the unsecured configuration.

When the securing structure 704 is in a locked configuration, a securing space, such as an enclosed space, may be established by the securing structure 704. For example, the securing space may correspond to a volume, such as the cavity 728 or a combination of the cavity 727 and the cavity 728, in which the electronic device 120 is contained while the securing structure 704 is configured in the locked configuration.

Referring to FIGS. 8A-B, views of an illustrative embodiment of a securing structure 804 are depicted. FIG. 8A depicts a first view 800 of the securing structure 804 and FIG. 8B depicts a second view 830 of the securing structure 804. For example, the securing structure 804 may correspond to the securing structure 1198 of FIG. 1A.

Referring to FIG. 8A, the first view 800 includes a security adapter 810, the electronic device 120, and the securing structure 804. The security adapter 810 may correspond to the security adapter 100 of FIG. 1A. The security adapter 810 may include one or more interfaces, such as a first interface 807 and a second interface 808. The first interface 807 may be configured to enable the security adapter 810 to be engaged with a host device, such as the host device 130 of FIG. 1A. The second interface 808 may be configured to enable the security adapter 810 to be engaged with one or more electronic devices, such as the electronic device 120. The security adapter 810 may include a locking device 850, as described further herein. For example, the locking device 850 may correspond to the locking device 450 of FIG. 4B, the locking device 490 of FIG. 4C, the locking device 550 of FIGS. 5A-B, the locking device 650 of FIG. 6B, or the locking device 750 of FIG. 7, as illustrative, non-limiting embodiments.

The securing structure 804 may include a strap 806 and a cap 826. The cap 826 may be coupled to the strap 806. For example, the cap 826 may include a groove (e.g., a channel) that accommodates the strap 806, as described with reference to FIGS. 9A-B. The cap 826 may be configured to receive one or more electronic devices, such as the electronic device 120, as described further with reference to FIG. 8B. For example, the cap 826 may include a cavity 828 configured to receive at least a portion of the one or more electronic devices, such as an end of the electronic device 120. The strap 806 and the cap 826 may be configured to enable the securing structure 804 to be configured in the secured position (the locked configuration), as described further with reference to FIG. 8B. For example, the strap 806, the cap 826, or a combination thereof, may be adjustable to configure the securing structure 804 in the locked configuration.

The strap 806 may be coupled to the security adapter 810. For example, a first portion of the strap 806 may be coupled to the security adapter 810. As another example, a second portion of the strap 806 may be configured to be coupled to, such as inserted in or through, the locking device 850 of the security adapter 810. The second portion of the strap 806 may be adjustable to configure the securing structure 804 in the locked configuration, as described further herein.

Referring to FIG. 8B, the second view 830 depicts the securing structure 804 in the locked configuration. In the locked configuration, the electronic device 120 is coupled to the security adapter 810. The strap 806 has been adjusted to configure the securing structure 804 in the locked configuration, e.g., the strap 806 has been pulled through the locking device 850. The locking device 850 may lock a position of the second portion of the strap 806 and may enable the cap 826 to be coupled to (e.g., engaged with) the electronic device 120. For example, a position of the cap 826 along the strap 806 may be adjusted for the cap 826 to receive at least a portion of the electronic device 120. When the electronic device 120 is engaged with the cap 826, the strap 806 may be adjusted and the locking device 850 may be engaged to secure the strap 806 and may configure the securing structure 804 in the locked configuration. The locking device 850 may include a mechanical and/or electronic locking device for securing the strap 806 with respect to the security adapter 810.

The securing structure 804 in the locked configuration may establish a securing space 840, such as an enclosed space, that corresponds to a volume in which the electronic device 120 is contained while the securing structure 804 is configured in the locked configuration. When the securing structure 804 is in the locked configuration and when the electronic device 120 is positioned within the securing space 840, the securing structure 804 may prohibit the electronic device 120 from being removed from the securing space 840. As an illustrative example, when the securing structure 804 is in the locked configuration and when the security adapter 810 is coupled to the electronic device 120 (e.g., physically and/or operationally coupled), the securing structure 804 may prevent the electronic device 120 from being removed from the security adapter 810.

Referring to FIGS. 9A-B, views of an illustrative embodiment of the securing structure of FIGS. 8A-B illustrating the cap 826 are depicted. For example, FIGS. 9A-B may illustrate the cap 826 when the securing structure 804 is in the locked configuration. FIG. 9A depicts a first view 900 (e.g., a side view) of the cap 826 and FIG. 9B depicts a second view 930 (e.g., a top view) of the cap 826. FIGS. 9A-B each includes the strap 806, the cap 826, and the electronic device 120.

Referring to FIG. 9A, the first view 900 illustrates that at least a portion of the electronic device 120 may be positioned in the cavity 828 of the cap 826. Referring to FIG. 9B, the second view 930 further illustrates that at least a portion of the electronic device 120 may be positioned in the cavity 828 of the cap 826. As depicted in the second view 930, the cap 826 may include a groove 960, or alternatively a channel, through which the strap 806 is positioned. For example, the strap 806 may be coupled to the cap 826 via the groove 960.

Referring to FIGS. 10A-B, views of an illustrative embodiment of a securing structure 1004 are depicted. FIG. 10A depicts a first view 1000 of the securing structure 1004 and FIG. 10B depicts a second view 1030 of the securing structure 1004. For example, the securing structure 1004 may correspond to the securing structure 1198 of FIG. 1A.

Referring to FIG. 10A, the first view 1000 includes the security adapter 410, the electronic device 120, and the securing structure 1004. The security adapter 410 may include one or more interfaces, such as the first interface 407 and the second interface 408. The security adapter 410 may be configured to be coupled to one or more electronic devices, such as the electronic device 120.

The securing structure 1004 may include a strap 1006, a cap 1026, and a holder 1072. The cap 1026 may be coupled to the strap 1006. For example, the strap 1006 and the cap 1026 may correspond to the strap 806 and the cap 826, respectively, of FIGS. 8A-B and 9A-B. The cap 1026 may include a groove (e.g., a channel) that accommodates the strap 1006. The cap 1026 may be configured to receive one or more electronic devices, such as the electronic device 120, as described further with reference to FIG. 10B. For example, the cap 1026 may include a cavity 1028 configured to receive the one or more electronic devices. The strap 1006 and the cap 1026 may be configured to enable the securing structure 1004 to be configured in the secured position (the locked configuration), as described further with reference to FIG. 10B. For example, the strap 1006 may be adjustable to configure the securing structure 1004 in the locked configuration. The strap 1006 and the cap 1026 may be configured to enable the securing structure 1004 to accommodate a range of sizes of electronic devices, such as the electronic device 120, that may be coupled to the security adapter 410.

The strap 1006 may be coupled to the holder 1072. The holder 1072 may include a holder opening 1012 and one or more strap interfaces, such as a first strap interface 1014 and a second strap interface 1018. The holder opening 1012 may be configured to be coupled to the security adapter 410. For example, the holder opening 1012 may be configured to fit around the first interface 407 of the security adapter 410.

A first portion of the strap 1006 may pass through the first strap interface 1014. A clasp 1070, such as a clamp, may be attached to the first portion of the strap 1006 to form a first loop. The holder 1072 may be coupled to the strap 1006 via the first loop. A second portion of the strap 806 may be configured to pass through the second strap interface 1018. The second portion of the strap 1006 may be adjustable to configure the securing structure 1004 in the locked configuration. A locking device 1050 may be used to create a second loop to configure the securing structure 1004 in the locked configuration, as described with reference to FIG. 10B. For example, the locking device 1050 may correspond to the locking device 450 of FIG. 4B, the locking device 490 of FIG. 4C, the locking device 550 of FIGS. 5A-B, the locking device 650 of FIG. 6B, the locking device 750 of FIG. 7, or the locking device 850 of FIGS. 8A-B, as illustrative, non-limiting examples As an illustrative, non-limiting example, the locking device 1050 may include a clamp configured with a lock to secure the strap 1006 and create the second loop. As another illustrative, non-limiting example, the strap 1006 may include multiple holes and the locking device 1050, such as a lock, a security tag, or a zip tie, may be placed through two holes of the strap 1006 to create the second loop.

Referring to FIG. 10B, the second view 1030 depicts the securing structure 1004 in the locked configuration. In the locked configuration, the electronic device 120 may be coupled to the security adapter 410. The strap 1006 has been adjusted to configure the securing structure 1004 in the locked configuration, e.g., the strap 1006 has been pulled through the second strap interface 1018 and secured using the locking device 1050. The locking device 1050 that secures the strap 1006 may enable the cap 1026 to be coupled to (e.g., engaged with) the electronic device 120. The locking device 1050 may include a mechanical and/or electronic locking device for securing the strap 1006. When the securing structure 1004 is in the locked configuration and when the electronic device 120 is engaged with the cap 1026, such that at least a portion of the electronic device is in the cavity 1028 of the cap 1026, the security adapter 410, the electronic device 120, or a combination thereof, may be prevented from being removed from the securing structure 1004. For example, when the securing structure 1004 is in the locked configuration, another electronic device is prohibited from being coupled to the security adapter 410 without first configuring the securing structure 1004 in an unlocked configuration (e.g., without destroying or damaging the securing structure 1004, such as breaking the securing structure 1004 into multiple parts). Accordingly, when the securing structure 1004 is in the locked configuration, the electronic device 120 cannot be "swapped" with a different electronic device. When the security adapter 410 is in the locked configuration, the securing structure 1004 in the locked configuration may restrict data transfer to occur between the electronic device 120 and another device via the security adapter 410.

The securing structure 1004 in the locked configuration may establish a securing space 1040, such as an enclosed space, that corresponds to a volume in which the security adapter 410, the electronic device 120, or a combination thereof, are contained while the securing structure 1004 is configured in the locked configuration. When the securing structure 1004 is in the locked configuration and when the electronic device 120 is positioned within the securing space 1040, the securing structure 1004 may prohibit the electronic device 120 from being removed from the securing space 1040. As an illustrative example, when the securing structure 1004 is in the locked configuration and when the security adapter 410 and the electronic device 120 are coupled (e.g., physically and/or operationally coupled), the securing structure 1004 may prevent the security adapter 410, the electronic device 120, or a combination thereof, from being removed from the security adapter 410. As another illustrative example, when the securing structure 1004 is in the locked configuration, the securing structure 1104 may permit the electronic device 120 to be communicatively decoupled from the interface 408 of the security adapter 410, but the security structure 1004 in the locked configuration may still not allow another electronic device to be connected to the interface 408 of the security adapter 1004 (e.g., the electronic device 120 may not be swapped with another electronic device).

Figure 11:
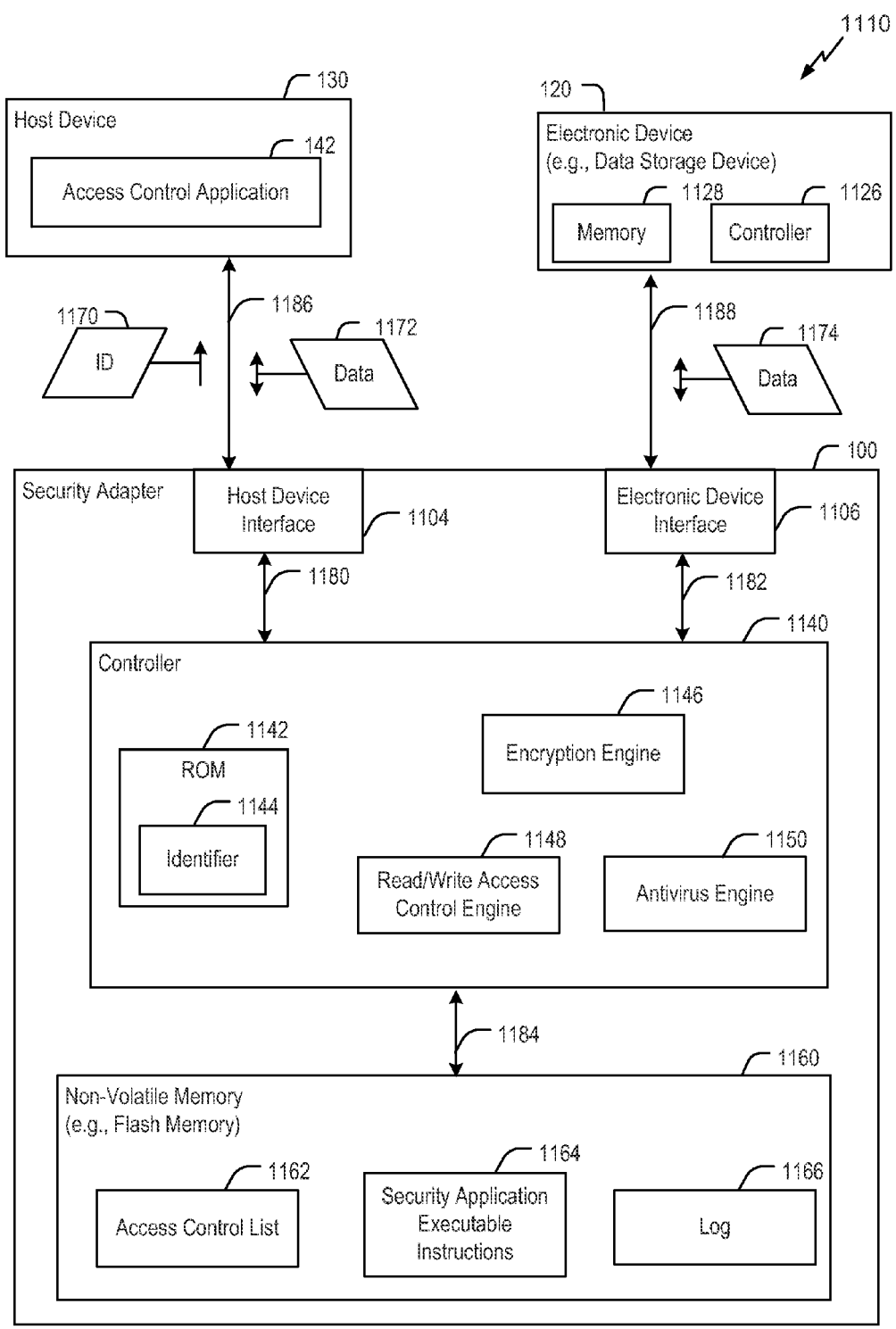
FIG. 11 illustrates a third system including a security adapter configured to engage an electronic device and a host device.

Referring to FIG. 11, a particular embodiment of a system including a security adapter configured to engage an electronic device and a host device is depicted and designated 1110. The system 1110 may include the host device 130, the security adapter 100, and the electronic device 120. The system 1110 may also include a securing structure (not shown), such as the securing structure 1198 of FIG. 1A.

The security adapter 100 may include the controller 1140 and a non-volatile memory 1160, such as a flash memory. The controller 1140 may be coupled to the non-volatile memory 1160 via a bus 1184. The security adapter 100 may be configured to receive user access operations and data access operations, such as data and/or instructions, from the host device 130 and/or from the electronic device 120, via the controller 1140, for execution by the controller 1140 and/or for storage in the non-volatile memory 1160. The controller 1140 may be further configured to send data and commands to the non-volatile memory 1160 and to receive data from the non-volatile memory 1160 via the bus 1184. For example, the controller 1140 may be configured to send data and a write command to instruct the non-volatile memory 1160 to store the data to a specified address of the non-volatile memory 1160. As another example, the controller 1140 may be configured to send a read command to read data from a specified address of the non-volatile memory 1160.

The controller 1140 may include a read only memory (ROM) 1142, an encryption engine 1146, a read/write access control engine 1148, and an antivirus engine 1150. The ROM 1142 may store the identifier 1144. Data may be exchanged via the security adapter 100 after the host device 130 verifies the identifier 1144 of the security adapter 100, such as verifying the ID 1170 provided by the security adapter 100 to the host device 130.

The controller 1140 may be configured to perform one or more security functions associated with at least one of read access or write access, by the host device 130, to the memory 1128 of the electronic device 120, as described herein. The one or more security functions may be associated with a policy, such as a security policy, that corresponds to the security adapter 100, to the electronic device 120, or to a combination thereof. For example, the controller 1140 may perform the one or more security functions using one or more of the encryption engine 1146, the read/write access control engine 1148, and/or the antivirus engine 1150.

As a first illustrative example, performing the one or more security functions may include preventing unauthorized access to the non-volatile memory 1160 and/or to the memory 1128. As a second illustrative example, performing the one or more security functions may include receiving an identifier of the host device 130 and comparing the identifier to an access list stored at the security adapter 100.

As a third illustrative example, performing the one or more security functions may include populating a log, such as a log 1166, based on access requests or data transfers between the electronic device 120 and the host device 130 via the security adapter 100. The log 1166 may be stored at the memory 1128 of the electronic device 120. Alternatively or additionally, the log 1166 may be stored at the non-volatile memory 1160 of the security adapter 100. Alternatively or additionally, the log 1166 may be stored at a memory associated with the host device 130.

As a fourth illustrative example, performing the one or more security functions may include executing (e.g., running) an antivirus application on data read from the non-volatile memory 1160, data read from the memory 1128, data to be written to the non-volatile memory 1160, data to be written to the memory 1128, or a combination thereof. As a fifth illustrative example, performing the one or more security functions may include encrypting data transferred between the electronic device 120 and the host device 130 via the security adapter 100. As a sixth illustrative example, performing the one or more security functions may include causing or signaling the host device 130 to present a prompt, such as via a display associated with the host device, for a user to enter a password to enable data to be transferred from the electronic device 120 to the host device 130 via the security adapter 100. As a seventh illustrative example, performing the one or more security functions may include updating a security policy stored at the non-volatile memory 1160. The security policy, such as encoded in the security application executable instructions 1164, may dictate the one or more security functions to be applied on a case-by-case basis.

The encryption engine 1146 may be configured to encrypt data, such as the data 1172 and/or the data 1174, transferred between the electronic device 120 and the host device 130 via the security adapter 100. For example, data from the host device 130 to be stored in the electronic device 120 may be encrypted (e.g., using an encryption key) by the security adapter 100 prior to storage at the electronic device 120 to be unrecoverable from the electronic device 120 without the security adapter 100 (or knowledge of the encryption key). The antivirus engine 1150 may be configured to execute an antivirus application on data read from the non-volatile memory 1160, data read from the memory 1128, data to be written to the non-volatile memory 1160, data to be written to the memory 1128, or a combination thereof.

The read/write access control engine 1148 may be configured to control read access operations, read access requests, write access operations, write access requests, or a combination thereof, to the host device 130, to the electronic device 120, or to the non-volatile memory 1160. Additionally or alternatively, the read/write access control engine 1148 may be configured to populate a log, such as the log 1166 in the non-volatile memory 1160, based on access requests or data transfers between the electronic device 120 and the host device 130 via the security adapter 100. The read/write access control engine 1148 may be configured to instruct or signal the host device 130 to present a prompt, such as via a display associated with the host device 130, for a password to enable data to be transferred between the electronic device 120 and the host device 130 via the security adapter 100.

The encryption engine 1146, the read/write access control engine 1148, and/or the antivirus engine 1150 may be implemented in the security adapter 100 as dedicated circuitry, as an application of a processor running at the security adapter 100 (e.g., a processor of the controller 1140), or a combination of dedicated circuitry and an executing application. For example, a processor at the controller 1140 may execute one or more instructions that cause the processor to execute one or more operations. For example, the one or more instructions may be stored in the non-volatile memory 1160 of the security adapter 100.

The non-volatile memory 1160 may include an access control list 1162, security application executable instructions 1164, and the log 1166. The access control list 1162 may include one or more identifiers, and each identifier may correspond to a different device, e.g., a different host device, that the security adapter 100 is authorized to be coupled to. For example, when the security adapter 100 is coupled to the host device 130, the security adapter 100 may receive a host identifier from the host device 130. The controller 1140, such as a processor of the controller 1140, may compare the host identifier to the one or more identifiers of the access control list 1162 to determine whether the security adapter 100 is authorized to communicate with the host device 130. For example, a processor of the controller 1140 may compare the host identifier to the one or more identifiers of the access control list 1162 to determine whether the security adapter 100 is authorized to exchange data with the host device 130.

The log 1166 may include data associated with access requests or data transfers between the electronic device 120 and the host device 130 via the security adapter 100. For example, the log 1166 may store a record of incoming data to be stored at the electronic device 120 and/or of data read from the electronic device 120. Although the log 1166 is illustrated as being stored in the non-volatile memory 1160, at least a portion of or all of the log 1166 may be stored at the memory 1128 of the electronic device 120 and/or at a memory associated with the host device 130.

The security application executable instructions 1164 may include one or more instructions or rules to be implemented by the controller 1140. For example, the one or more instructions or rules may be implemented by the encryption engine 1146, by the read/write access control engine 1148, by the antivirus engine 1150, by a processor of the controller 1140, or by a combination thereof. The one or more instructions or rules may be associated with policy (e.g., a security policy) that corresponds to the security adapter 100, to the electronic device 120, or to a combination thereof. The security policy may indicate the one or more functions performed or executed by the controller 1140. The controller 1140 may be configured to update the one or more instructions or rules of the security policy stored at the non-volatile memory 1160. For example, the controller 1140 may update the one or more instructions or rules based on an update received from the host device 130.

The security application executable instructions 1164 may further include source code for one or more security applications run by the controller 1140. To illustrate, the security application executable instructions 1164 may include instructions executable at the controller 1140 to implement the encryption engine 1146, the read/write access control engine 1148, the antivirus engine 1150, or a combination thereof.

Figure 12:
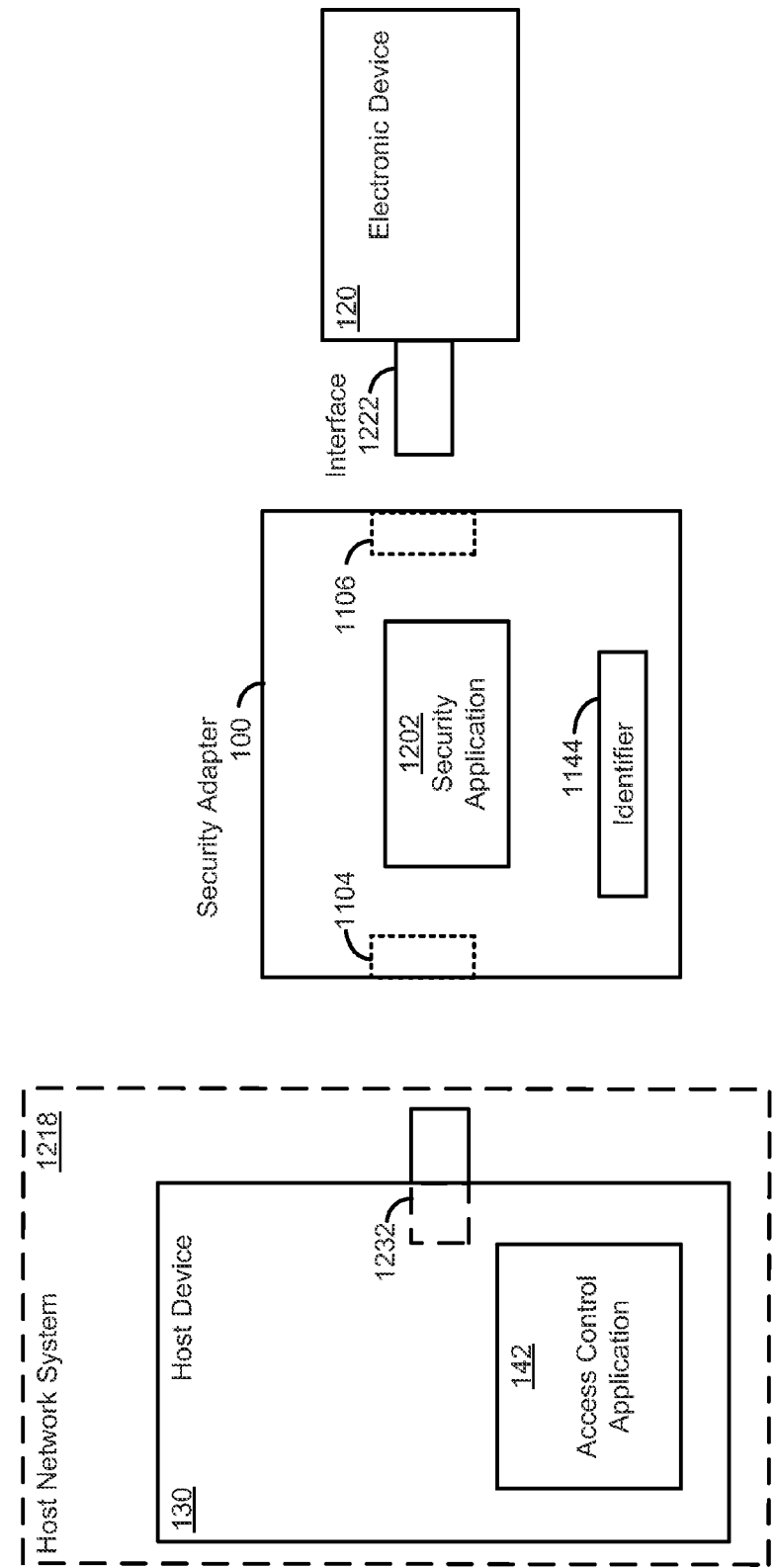
FIG. 12 illustrates a fourth system including a security adapter configured to engage an electronic device and a host device.

Referring to FIG. 12, a system including a security adapter configured to engage an electronic device and a host device is depicted and designated 1200. The system 1200 may include the host device 130, the security adapter 100, and the electronic device 120. The host device 130 may be included in or associated with a host network system 1218. The host device 130 may be configured to be coupled to the security adapter 100 and/or the electronic device 120 via a host interface 1232. The electronic device 120 may be configured to be coupled to the security adapter 100 and/or the host device 130 via an electronic device interface 1222.

The security adapter 100 may include a security application 1202. The security application 1202 may include a security policy associated with the security adapter 100 and/or associated with the electronic device 120. For example, the security policy may indicate one or more one or more security functions that are to be applied and that are associated with user access operations and data access operations performed between the host device 130 and the electronic device 120 via the security adapter 100. The security application 1202 may be provided to the security adapter 100 when the security adapter 100 and/or the electronic device 120 are registered with an administrator associated with the host device 130 and/or associated with the host network system 1218. When the host device 130 authorizes the security adapter 100 based on the identifier 1144, the security adapter 100 may provide the security application 1202 to the host device 130 to be executed in conjunction with the access control application 142. Alternatively or additionally, the security adapter 100 may implement the security application 1202 for data transferred between the host device 130 and the electronic device 120 via the security adapter 100.

Figure 13:
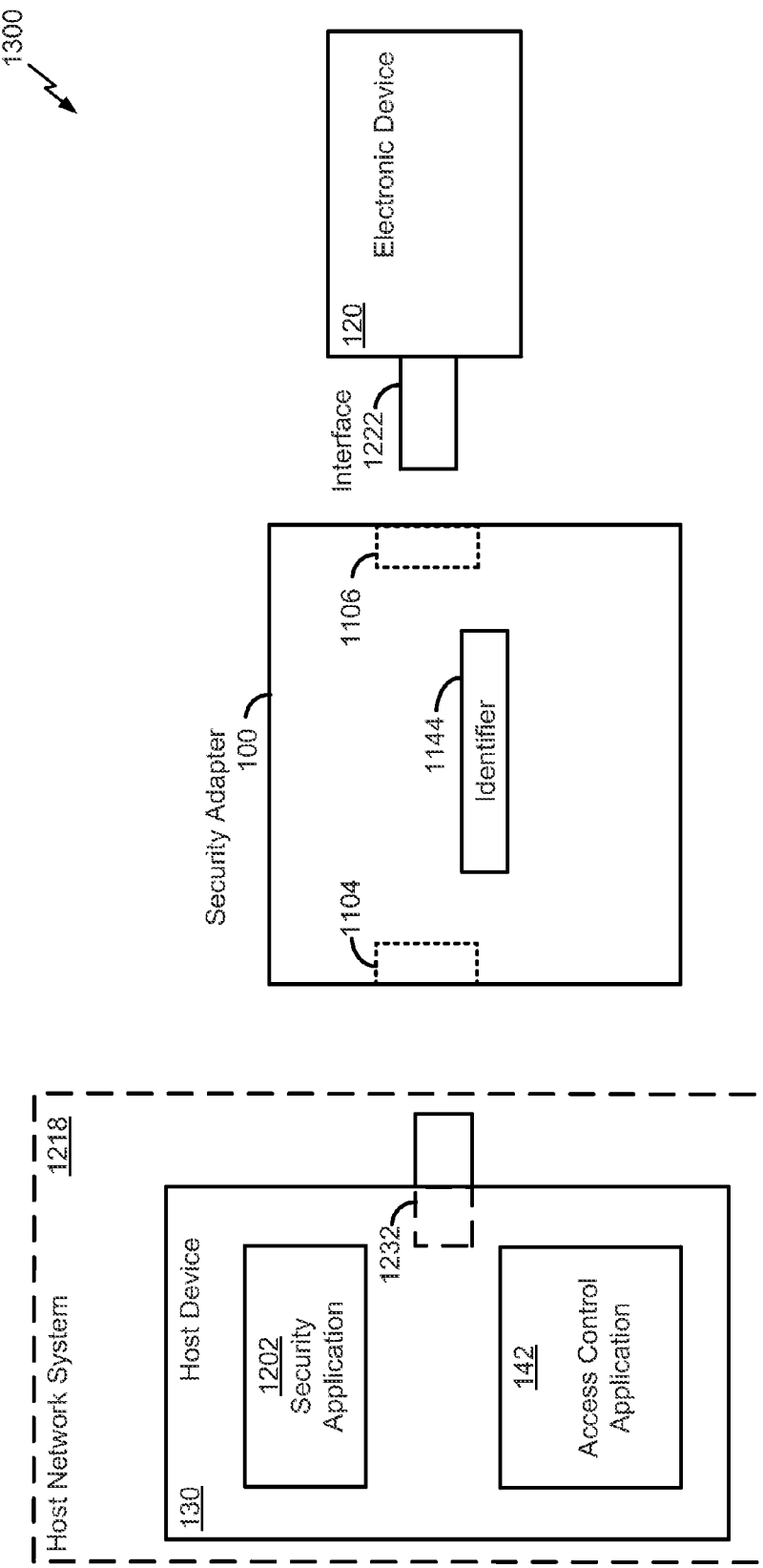
FIG. 13 illustrates a fifth system including a security adapter configured to engage an electronic device and a host device.

Referring to FIG. 13, a system including a security adapter configured to engage an electronic device and a host device is depicted and designated 1300. The system 1300 may include the host device 130, the security adapter 100, and the electronic device 120. The host device 130 may be included in or associated with a host network system 1218.

As illustrated in FIG. 13, the host device 130 may include the security application 1202. When the host device 130 authorizes the security adapter 100 based on the identifier 1144, the host device 130 may execute the security application 1202. Alternatively or additionally, the host device 130 may provide the security application 1202 to the security adapter 100 and/or to the electronic device 120 to be executed for restricting user access operations and data access operations performed between the host device 130 and the electronic device 120 via the security adapter 100 according to one or more security policies.

Figure 14:
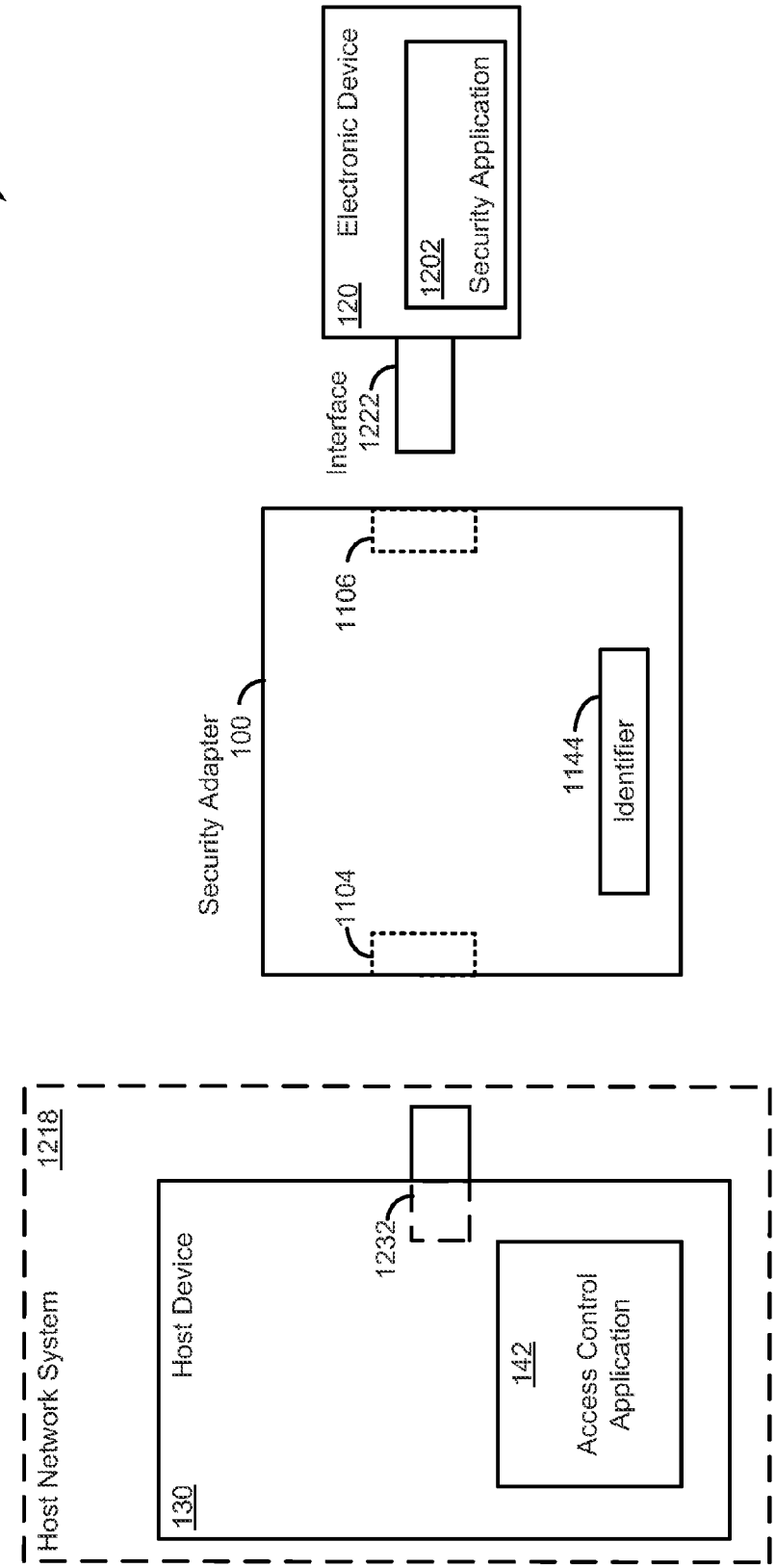
FIG. 14 illustrates an embodiment of a system including a security adapter configured to engage an electronic device and a host device.

Referring to FIG. 14, a system including a security adapter configured to engage an electronic device and a host device is depicted and designated 1400. The system 1400 may include the host device 130, the security adapter 100, and the electronic device 120. The host device 130 may be included in or associated with a host network system 1218.

As illustrated in FIG. 14, the electronic device 120 may include the security application 1202. When the host device 130 authorizes the security adapter 100 based on the identifier 1144, the electronic device 120 may execute the security application 1202. Alternatively or additionally, the electronic device 120 may provide the security application 1202 to the security adapter 100 and/or to the host device 130 to be executed for restricting user access operations and data access operations performed between the host device 130 and the electronic device 120 via the security adapter 100 according to one or more security policies.

Figure 15:
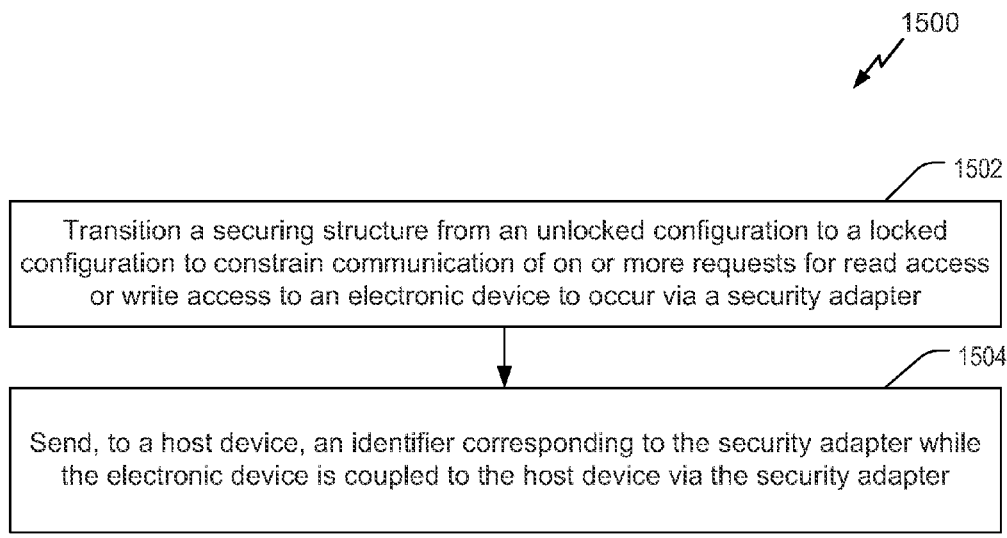
FIG. 15 is a flow chart that depicts a first illustrative embodiment of a method of using a security apparatus.

Referring to FIG. 15 is a flow chart of a first illustrative embodiment of a method 1500 of using a security apparatus. The method 1500 may be performed by a securing apparatus including a securing structure and a security adapter. The securing structure may correspond to the securing structure 1198 of FIG. 1A, the securing structure 160 of FIG. 1B, the interlocking structure 110 of FIGS. 3A-C, the securing structure 404 of FIGS. 4A-C, the securing structure 504 of FIGS. 5A-B, the securing structure 604 of FIGS. 6A-B, the securing structure 704 of FIG. 7, the securing structure 804 of FIGS. 8A-B, the securing structure 1004 of FIGS. 10A-B, or a combination thereof, as illustrative, non-limiting examples. The security adapter may include a controller and a non-volatile memory. The security adapter may include the security adapter 100, the security adapter 410, the security adapter 810, or a combination thereof, as illustrative, non-limiting examples.

The method 1500 includes transitioning a securing structure from an unlocked configuration to a locked configuration to constrain communication of one or more requests for read access or write access to an electronic device to occur via a security adapter, at 1502. The electronic device may include the electronic device 120 of FIG. 1A. For example, when the securing structure is in a locked configuration and when the security adapter is coupled to a particular electronic device, the securing structure may prevent removal of the electronic device from the securing structure such that a different electronic device may be coupled to the security adapter instead of the particular electronic device. For example, the particular electronic device cannot be easily switched with another electronic device that may not be authorized to access a host network. When the securing structure is in a locked configuration and when the security adapter is coupled to the electronic device, the security adapter may be enabled to be coupled with the host device.

The method 1500 includes sending, to a host device, an identifier corresponding to the security adapter while the electronic device is coupled to the host device via the security adapter, at 1504. The identifier may include the identifier 1144 that is sent as the ID 1170 from the security adapter 100 to the host device 130 of FIG. 1A.

Figure 16:
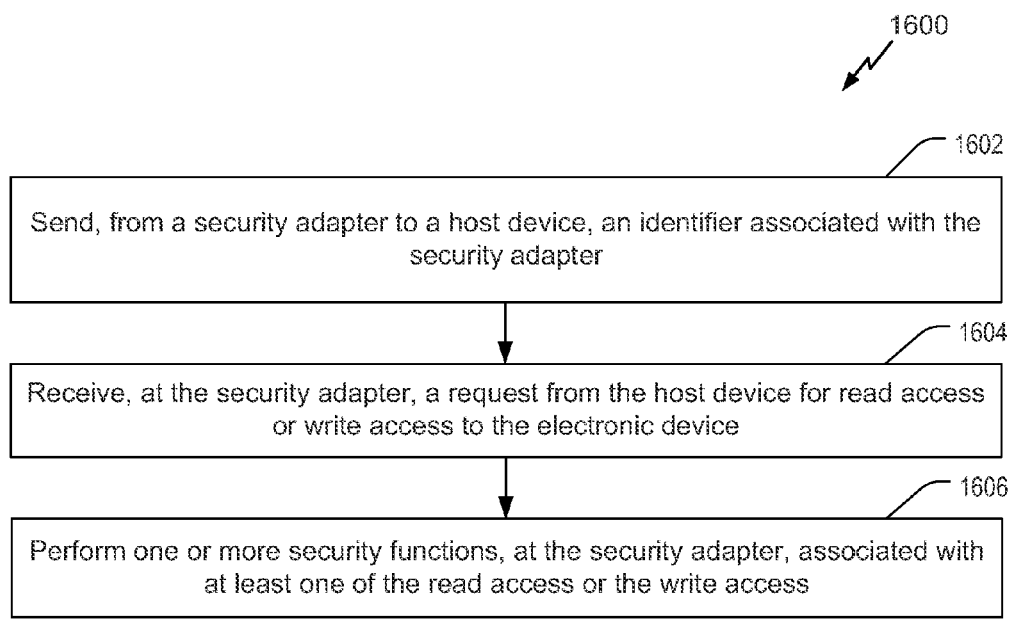
FIG. 16 is a flow chart that depicts a first illustrative embodiment of a method of operating a security adapter.

FIG. 16 depicts a flow chart of a first illustrative embodiment of a method 1600 of operating a security adapter. The method 1600 may be performed by a securing apparatus including a securing structure and a security adapter. The securing structure may correspond to the securing structure 1198 of FIG. 1A, the securing structure 160 of FIG. 1B, interlocking structure 110 of FIGS. 3A-C, the securing structure 404 of FIGS. 4A-C, the securing structure 504 of FIGS. 5A-B, the securing structure 604 of FIGS. 6A-B, the securing structure 704 of FIG. 7, the securing structure 804 of FIGS. 8A-B, the securing structure 1004 of FIGS. 10A-B, or a combination thereof, as illustrative, non-limiting examples. The security adapter may include a controller and a non-volatile memory. The security adapter may be configured to engage an electronic device. The electronic device, such as the electronic device 120 of FIG. 1A, may include a non-volatile memory. The method 1500 may be performed when the electronic device is engaged with the security adapter and communicatively coupled to a host device, such as the host device 130 of FIG. 1A, via the security adapter.

The method 1600 includes sending, from the security adapter to the host device, an identifier associated with the security adapter, at 1602. The identifier may include the identifier 1144 which is sent as the ID 1170 from the security adapter 100 to the host device 130 of FIG. 1A. The security adapter may correspond to the security adapter 100, the security adapter 410, the security adapter 810, or a combination thereof, as illustrative, non-limiting examples.

The method 1600 includes receiving, at the security adapter, a request from the host device for read access or write access to the electronic device, at 1604. The method 1600 further includes performing one or more security functions, at the security adapter, associated with at least one of the read access or the write access, at 1606. The one or more security functions may be associated with a security policy, such as one or more rules, that is stored at the host device, a host network system associated with the host device, the security adapter, or the electronic device. For example, the security policy may be included in or defined by the access control application 142 of FIG. 1A, the security application executable instructions 1164 of FIG. 11, the security application 1202 of FIGS. 12-14, or a combination thereof, as illustrative, non-limiting examples.

The one or more security functions may include may prevent unauthorized access to the first memory. For example, performing the one or more security functions includes receiving an identifier of the host device and comparing the identifier to an access list in the security adapter. As another example, performing the one or more security functions may include populating a log based on access requests or data transfers between the electronic device and the host device via the security adapter. To illustrate, the log may be associated with at least one of incoming data to be stored at the electronic device or data read from the electronic device, at a memory of the electronic device. The log may be stored at a memory of the electronic device, at a memory of the security adapter, at a memory associated with the host, or a combination thereof.

Performing the one or more security functions may include executing an antivirus application on at least one of incoming data to be stored at the memory or data read from the first memory, encrypting data transferred between the electronic device and the host device via the security adapter, and/or requesting the host device to present a prompt for a user to enter a password to enable data to be transferred from the electronic device to the host device via the security adapter. Additionally or alternatively, performing the one or more security functions may include updating a security policy stored at a memory of the security adapter. For example, the security policy may indicate the one or more security functions.

Although various components depicted herein are illustrated as block components and described in general terms, such components may include one or more microprocessors, state machines, or other circuits configured to enable the security adapter 100 of FIG. 11 to perform one or more security functions. For example, the controller 1140 of FIG. 11 may represent physical components, such as hardware controllers, state machines, logic circuits, or other structures, to enable the controller 1140 to perform decryption/encryption at the encryption engine 1146, to perform read/write access control at the read/write access control engine 1148, and/or to perform antivirus scanning and remedial action at the antivirus engine 1150.

Alternatively or additionally, the components may include one or more microprocessors, state machines, or other circuits configured to enable the controller 1140 of FIG. 11 to perform one or more security functions associated with at least one of read access or write access, by the host device, to a memory of the electronic device. As an example, the encryption engine 1146, the read/write access control engine 1148, the antivirus engine 1150, or a combination thereof, may represent physical components, such as hardware controllers, state machines, logic circuits, or other structures, to enable the controller 1140 to perform one or more security functions associated with at least one of read access or write access, by the host device, to a memory of the electronic device.

One or more of the encryption engine 1146, the read/write access control engine 1148, or the antivirus engine 1150 may be implemented using a microprocessor or microcontroller programmed to perform functions described with respect to the particular engine 1146-1150. For example, to implement the encryption engine 1146, the microprocessor or the microcontroller may be programmed to receive an encryption key from a host device, to receive the encryption key from a user interface of the security adapter, or to retrieve the encryption key from a read operation performed at a memory of the security adapter, such as a read-only memory (ROM). The microprocessor or microcontroller may also be configured to receive data to be encrypted, such as data received from a host device to be stored to an electronic device coupled to the security adapter. The microprocessor or microcontroller may also be configured to execute instructions that apply an encryption algorithm to the received data to generate encrypted data. For example, the encryption algorithm may include a publicly available cryptographic algorithm, such as an Advanced Encryption Standard (AES) compliant with the United States Government's National Institute of Standards and Technology (NIST) Federal Information Processing Standard (FIPS) Publication 140-2, (FIPS PUB 140-2), as an illustrative, non-limiting implementation.

As another example, to implement the read/write access control engine 1148, the microprocessor or the microcontroller may be programmed to receive a request for access to a memory at the host device or to a memory at the electronic device. The microprocessor or the microcontroller may be programmed to compare one or more parameters corresponding to the request to a security policy corresponding to the requestor. For example, an identifier may be received from the host device and the microprocessor may search a stored list of identifiers that are related to one or more security policies and may locate a particular security policy corresponding to the received identifier. The microprocessor or the microcontroller may be programmed to compare a parameter of the request, such as a request type (e.g., to write data to the electronic device) to a corresponding permission indicated in the located security policy (e.g., indicating whether writing data is permitted), and to allow the request to be processed when the permission allows the request parameter(s) or to prohibit the request from being processed when the permission does not allow one or more of the request parameter(s). As an example, the microprocessor or the microcontroller may be programmed to prohibit the request by generating a response to the request that indicates that the request has failed and/or is not authorized, sending the response to the requestor, and discarding the request.

As another example, to implement the antivirus engine 1150, the microprocessor or the microcontroller may be programmed to receive data to be provided to the host device or to a memory at the electronic device. The microprocessor or the microcontroller may be programmed to compare one or more portions of the data to one or more stored "signatures" that are bit patterns that correspond to suspected or actual malicious code. In response to determining that one or more of the signatures matches at least a portion of the data, the microprocessor or the microcontroller may be programmed to prevent the data from being provided to the host device or to the electronic device, such as by discarding the data and generating a message indicating that the data is not retrievable or is suspected of including malicious code, or by replacing the data with dummy data that is recognizable as erroneous by a requesting device (e.g., an all-zeros pattern).

The controller 1140 of FIG. 11 may include a processor executing instructions that are stored at a non-volatile memory, such as at the non-volatile memory 1160. Alternatively, or in addition, executable instructions that are executed by the processor may be stored at a separate memory location that is not part of the non-volatile memory, such as at a read-only memory (ROM).

As a particular illustrative example, the electronic device 120 and/or the security adapter 100 may be attached or embedded within one or more host devices, such as within a housing of a host communication device. However, in other embodiments, the electronic device 120 and/or the security adapter 100 may be implemented in a portable device configured to be selectively coupled to one or more external devices. For example, the electronic device 120 and/or the security adapter 100 may be within a packaged apparatus such as a wireless telephone, a tablet computer, a personal digital assistant (PDA), a gaming device or console, a portable navigation device, or other device that uses internal non-volatile memory. In a particular embodiment, the electronic device 120 and/or the security adapter 100 may be coupled to a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
    a security adapter configured to be engaged with an electronic device, the security adapter including an interface configured to couple to a host device; and
    a securing structure that is lockable, wherein:
        when the security adapter is engaged with the electronic device:
            the securing structure is configured to transition from an unlocked configuration to a locked configuration;
            physical disengagement of the electronic device from the security adapter is impeded to a greater extent in the locked configuration than in the unlocked configuration;
            in the locked configuration, communication of one or more requests from the host device for read access or write access to the electronic device is constrained; and
            in the locked configuration, the communication between the host device and the electronic device occurs via the security adapter.

2. The apparatus of claim 1, wherein the securing structure is further configured to, in the locked configuration, securely and physically couple the electronic device to the security adapter.

3. The apparatus of claim 1, wherein the securing structure is further configured to, in the locked configuration, restrict data transfer from occurring between the electronic device and another device.

4. The apparatus of claim 1, wherein the electronic device comprises an electronic storage device.

5. The apparatus of claim 1, wherein the securing structure comprises a slidable element with latches that mechanically lock the slidable element to the security adapter.

6. The apparatus of claim 1, wherein, when the securing structure is in the locked configuration and when the security adapter is engaged with the electronic device, the electronic device is located at least partially within a securing space associated with the securing structure.

7. The apparatus of claim 1, wherein:
    an interior surface of the securing structure defines a cavity, the cavity located within the securing structure and including an open end, and
    a cover of the securing structure is configured to be positioned at the open end to define an enclosed volume within the securing structure, and
    the open end is configured to receive one or both of the electronic device and the security adapter when the securing structure is in an unlocked configuration.

8. The apparatus of claim 7, wherein the cover is further configured to be secured to the securing structure via a locking device.

9. The apparatus of claim 8, wherein the locking device includes a mechanical lock, a security tag, or a zip tie.

10. The apparatus of claim 1, wherein the securing structure comprises a strap and a cap, wherein the cap is configured to receive one or more electronic devices, and wherein, when the security adapter is engaged with the electronic device and the securing structure is in the locked configuration, the electronic device is communicatively coupled to the security adapter and the cap is physically coupled to the electronic device.

11. The apparatus of claim 10, wherein the strap is adjustable to configure the securing structure in the locked configuration.

12. The apparatus of claim 1, wherein the security adapter includes a controller and a non-volatile memory, the non-volatile memory having a three-dimensional (3D) memory configuration that includes memory cells, the controller being associated with operation of the memory cells.

13. A method comprising:
in a securing apparatus that includes a securing structure that is lockable, performing:
while an electronic device is coupled to a security adapter:
transitioning the securing structure from an unlocked configuration to a locked configuration, the electronic device impeded from being physically decoupled from the security adapter to a greater extent in the locked configuration than in the unlocked configuration;
in the locked configuration, constraining communication of one or more requests from a host device for read access or write access to the electronic device and performing the communication between the host device and the electronic device via the security adapter; and
sending, to the host device, an identifier corresponding to the security adapter.

14. The method of claim 13, wherein:
the securing structure in the locked configuration prevents physical access to the electronic device and to the security adapter,
the one or more requests include a particular request from the host device for read access or write access to the electronic device, and
constraining the communication comprises preventing the electronic device from receiving the particular request directly from the host device.

15. The method of claim 13, wherein the securing structure in the locked configuration restricts another electronic device from being physically coupled to the security adapter.

16. The method of claim 13, wherein sending the identifier to the host device while the electronic device is retained within the securing structure enables a security protocol associated with the host device to set an access permission for transferring data between the electronic device and the host device via the security adapter.

17. The method of claim 13, wherein the identifier is sent in response to the security adapter detecting that the security adapter is connected to the host device.

18. The method of claim 13, further comprising mechanically locking the securing structure to the security adapter.

19. The method of claim 13, further comprising, when the electronic device is at least partially within a securing space associated with the securing structure and when the securing structure is in the locked configuration, coupling the electronic device to the host device.

20. The method of claim 19, wherein the securing space is defined by a cover and a container, the container having an open end configured to receive the electronic device and the security adapter when the cover is removed from the open end, and further comprising:
when the electronic device is at least partially within the securing space, disallowing removal of the electronic device when the cover is fastened to the open end.

21. The method of claim 20, further comprising securing the cover to the container via a locking device.

22. The method of claim 13, further comprising adjusting a strap and a cap, wherein adjusting the strap and the cap configures the securing structure in the locked configuration.

23. The method of claim 13, further comprising controlling an operation associated with a non-volatile memory coupled to the electronic device, the non-volatile memory having a three-dimensional (3D) memory configuration that includes memory cells.

24. The method of claim 13, further comprising mechanically locking the securing structure to the security adapter, wherein a slidable element of the securing structure includes latches that mechanically lock the slidable element to the security adapter.

25. An apparatus comprising:
a device configured to be electronically connected to a security adapter and to be mechanically locked with the security adapter;
a non-volatile memory coupled to the device; and
a processor coupled to the non-volatile memory, the processor configured to:
load, from the security adapter, an electronic device, or a combination of the security adapter and the electronic device, an access control application onto a host device; and
send, from the security adapter to the host device, an identifier associated with the security adapter.

26. The apparatus of claim 25, wherein the processor is further configured to:
access a security policy stored at the non-volatile memory;
identify a rule of the security policy; and
perform a particular security function indicated by the rule, wherein performance of the particular security function is associated with a request from the host device for read access or write access to the device, and wherein the request is received at the security adapter.

27. The apparatus of claim 25, wherein the non-volatile memory has a three-dimensional (3D) memory configuration that includes memory cells, the processor associated with operation of the memory cells.

28. The apparatus of claim 25, wherein the processor is further configured to:
receive, at the security adapter, a request from the host device for read access or write access to the device; and
in response to the request received at the security adapter, perform one or more security functions associated with at least one of the read access or the write access.

29. The apparatus of claim 28, wherein the processor is further configured to perform the one or more security functions by receiving an identifier of the host device and comparing the identifier of the host device to an access list in the security adapter.

30. The apparatus of claim 28, wherein, to perform the one or more security functions, the processor is further configured to populate a log based on access requests or data transfers between the device and the host device via the security adapter.

31. The apparatus of claim 28, wherein, to perform the one or more security functions, the processor is further configured to execute an antivirus application to scan incoming data to be stored at the device or to scan data read from the device.

32. The apparatus of claim 28, wherein, to perform the one or more security functions, the processor is further configured to encrypt data transferred between the device and the host device via the security adapter.

33. The apparatus of claim 28, wherein, to perform the one or more security functions, the processor is further configured to request the host device to present a prompt for a password to be entered to enable data to be transferred from the device to the host device via the security adapter.

34. The apparatus of claim 28, wherein the processor is further configured to perform the one or more security functions by updating a security policy stored at the non-volatile memory, and wherein the security policy includes one or more rules that indicate the one or more security functions.

35. A method comprising:

in a security adapter configured to engage an electronic device, the electronic device including a non-volatile memory, performing, when the electronic device is locked with the security adapter and communicatively coupled to a host device via the security adapter:

loading, from the security adapter, the electronic device, or a combination of the security adapter and the electronic device, an access control application onto the host device; and sending, from the security adapter to the host device, an identifier associated with the security adapter.

36. The method of claim 35, further comprising:

performing, at the security adapter, one or more security functions associated with a request from the host device for read access or write access to the electronic device, wherein the one or more security functions restrict unauthorized access to the non-volatile memory, and wherein performing the one or more security functions includes receiving an identifier of the host device and comparing the identifier of the host device to an access list in the security adapter.

37. The method of claim 35, further comprising controlling an operation associated with the non-volatile memory, the non-volatile memory having a three-dimensional (3D) memory configuration that includes memory cells.

38. The method of claim 35, further comprising:

performing, at the security adapter, one or more security functions associated with a request from the host device for read access or write access to the electronic device, wherein performing the one or more security functions comprises populating, at the security adapter, a log based on access requests or data transfers, via the security adapter, between the electronic device and the host device.

39. The method of claim 38, further comprising storing the log at the non-volatile memory of the electronic device, wherein the security adapter is a distinct device from the electronic device and the host device.

40. The method of claim 38, further comprising storing the log at a memory of the security adapter.

41. The method of claim 38, further comprising storing the log at a memory associated with the host device.

42. The method of claim 35, further comprising:

receiving, at the security adapter, a request from the host device for read access or write access to the electronic device; and in response to receiving the request, performing, at the security adapter, one or more security functions associated with at least one of the read access or the write access.

43. The method of claim 42, wherein performing the one or more security functions comprises storing a log associated with at least one of incoming data to be stored at the electronic device or data read from the electronic device, and wherein the log is stored at the non-volatile memory of the electronic device.

44. The method of claim 42, wherein performing the one or more security functions comprises executing, at the security adapter, an antivirus application to scan incoming data to be stored at the non-volatile memory or to scan data read from the non-volatile memory.

45. The method of claim 42, wherein performing the one or more security functions comprises encrypting, at the security adapter, data transferred between the electronic device and the host device via the security adapter.

46. The method of claim 42, wherein performing the one or more security functions comprises updating a security policy stored at a memory of the security adapter, and wherein the security policy includes one or more rules that indicate the one or more security functions.

47. The method of claim 35, further comprising at least one of: signaling the host device to present a prompt for a password to be entered, or enabling the electronic device to exchange data with the host device via the security adapter after the host device verifies the identifier of the security adapter.

* * * * *